(12) United States Patent
Ording

(10) Patent No.: US 9,239,677 B2
(45) Date of Patent: Jan. 19, 2016

(54) OPERATION OF A COMPUTER WITH TOUCH SCREEN INTERFACE

(75) Inventor: Bas Ording, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1075 days.

(21) Appl. No.: 11/696,701

(22) Filed: Apr. 4, 2007

(65) Prior Publication Data

US 2007/0174788 A1     Jul. 26, 2007

Related U.S. Application Data

(63) Continuation of application No. 11/228,700, filed on Sep. 16, 2005, now Pat. No. 7,614,008, which is a continuation-in-part of application No. 10/903,964, filed on Jul. 30, 2004, now Pat. No. 8,479,122.

(51) Int. Cl.
*G06F 3/033*     (2013.01)
*G06F 3/0488*     (2013.01)

(52) U.S. Cl.
CPC ........ *G06F 3/04886* (2013.01); *G06F 3/04883* (2013.01); *G06F 2203/04808* (2013.01)

(58) Field of Classification Search
USPC ........................... 715/761, 816, 828; 345/168
See application file for complete search history.

(56) References Cited

U.S. PATENT DOCUMENTS

| | | |
|---|---|---|
| 3,333,160 A | 7/1967 | Gorski |
| 3,541,541 A | 11/1970 | Englebart |
| 3,609,695 A | 9/1971 | Pirkle |
| 3,662,105 A | 5/1972 | Hurst et al. ..................... 178/18 |
| 3,748,751 A | 7/1973 | Breglia et al. |
| 3,757,322 A | 9/1973 | Barkan et al. |
| 3,798,370 A | 3/1974 | Hurst ............................. 178/18 |
| 3,825,730 A | 7/1974 | Worthington, Jr. et al. |
| 3,846,826 A | 11/1974 | Mueller |
| 4,014,000 A | 3/1977 | Uno et al. |
| 4,017,848 A | 4/1977 | Tannas, Jr. |
| 4,146,924 A | 3/1979 | Birk et al. |
| 4,202,041 A | 5/1980 | Kaplow et al. |

(Continued)

FOREIGN PATENT DOCUMENTS

| | | | |
|---|---|---|---|
| CA | 1243096 | 10/1988 | ................... 340/180 |
| DE | 100 42 300 | 3/2002 | |

(Continued)

OTHER PUBLICATIONS

"4-Wire Resistive Touchscreens" obtained from http://www.touchscreens.com/intro-touchtypes-4resistive.html generated Aug. 5, 2005.

(Continued)

*Primary Examiner* — Stephen Alvesteffer
(74) *Attorney, Agent, or Firm* — Morrison & Foerster LLP

(57) ABSTRACT

A touch screen computer executes an application. A method of operating the touch screen computer in response to a user is provided. A virtual input device is provided on the touch screen. The virtual input device comprises a plurality of virtual keys. It is detected that a user has touched the touch screen to nominally activate at least one virtual key, and a behavior of the user with respect to touch is determined. The determined behavior is processed and a predetermined characteristic is associated with the nominally-activated at least one virtual key. A reaction to the nominal activation is determined based at least in part on a result of processing the determined behavior.

30 Claims, 7 Drawing Sheets

(56) References Cited

U.S. PATENT DOCUMENTS

| | | | |
|---|---|---|---|
| 4,219,847 A | 8/1980 | Pinkney et al. | |
| 4,246,452 A | 1/1981 | Chandler | 200/5 |
| 4,303,856 A | 12/1981 | Serras-Paulet | |
| 4,305,037 A | 12/1981 | Breckel | |
| 4,305,071 A | 12/1981 | Bell et al. | |
| 4,305,131 A | 12/1981 | Best | |
| 4,346,376 A | 8/1982 | Mallos | |
| 4,375,674 A | 3/1983 | Thornton | |
| 4,396,945 A | 8/1983 | DiMatteo et al. | |
| 4,435,835 A | 3/1984 | Sakow et al. | |
| 4,475,122 A | 10/1984 | Green | |
| 4,484,179 A | 11/1984 | Kasday | |
| 4,542,375 A | 9/1985 | Alles et al. | |
| 4,550,221 A | 10/1985 | Mabusth | 178/18 |
| 4,561,017 A | 12/1985 | Greene | |
| 4,613,942 A | 9/1986 | Chen | |
| 4,629,319 A | 12/1986 | Clarke et al. | |
| 4,631,525 A | 12/1986 | Serravalle, Jr. | |
| 4,631,676 A | 12/1986 | Pugh | |
| 4,644,100 A | 2/1987 | Brenner et al. | |
| 4,644,326 A | 2/1987 | Villalobos et al. | |
| 4,654,872 A | 3/1987 | Hisano et al. | |
| 4,672,364 A | 6/1987 | Lucas | 340/365 P |
| 4,672,558 A | 6/1987 | Beckes et al. | 364/518 |
| 4,686,374 A | 8/1987 | Liptay-Wagner et al. | |
| 4,692,809 A | 9/1987 | Beining et al. | 358/247 |
| 4,695,827 A | 9/1987 | Beining et al. | 340/365 P |
| 4,698,625 A | 10/1987 | McCaskill et al. | |
| 4,703,306 A | 10/1987 | Barritt | |
| 4,710,760 A | 12/1987 | Kasday | |
| 4,725,829 A | 2/1988 | Murphy | |
| RE32,632 E | 3/1988 | Atkinson | |
| 4,733,222 A | 3/1988 | Evans | 340/365 C |
| 4,734,685 A | 3/1988 | Watanabe | 340/710 |
| 4,736,191 A * | 4/1988 | Matzke et al. | 341/20 |
| 4,746,770 A | 5/1988 | McAvinney | 178/18 |
| 4,763,356 A | 8/1988 | Day, Jr. et al. | |
| 4,771,276 A | 9/1988 | Parks | |
| 4,772,028 A | 9/1988 | Rockhold et al. | |
| 4,787,040 A | 11/1988 | Ames et al. | |
| 4,788,384 A | 11/1988 | Bruere-Dawson et al. | 178/18 |
| 4,806,846 A | 2/1989 | Kerber | 324/60 CD |
| 4,814,759 A | 3/1989 | Gombrich et al. | |
| 4,853,888 A | 8/1989 | Lata et al. | |
| 4,896,291 A | 1/1990 | Gest et al. | |
| 4,898,555 A | 2/1990 | Sampson | 445/22 |
| 4,914,624 A | 4/1990 | Dunthorn | |
| 4,942,514 A | 7/1990 | Miyagaki et al. | |
| 4,948,371 A | 8/1990 | Hall | |
| 4,968,877 A | 11/1990 | McAvinney et al. | 250/221 |
| 4,988,981 A | 1/1991 | Zimmerman et al. | |
| 4,993,806 A | 2/1991 | Clausen et al. | |
| 5,003,519 A | 3/1991 | Noirjean | 368/73 |
| 5,017,030 A | 5/1991 | Crews | 400/485 |
| 5,038,401 A | 8/1991 | Inotsume | 455/92 |
| 5,045,843 A | 9/1991 | Hansen | |
| 5,045,846 A | 9/1991 | Gay et al. | |
| 5,053,758 A | 10/1991 | Cornett et al. | 340/712 |
| 5,072,294 A | 12/1991 | Engle | |
| 5,119,079 A | 6/1992 | Hube et al. | |
| 5,146,556 A | 9/1992 | Hullot et al. | |
| 5,153,829 A | 10/1992 | Furuya et al. | |
| 5,168,531 A | 12/1992 | Sigel | |
| 5,178,477 A | 1/1993 | Gambaro | 400/489 |
| 5,189,403 A | 2/1993 | Franz et al. | 340/711 |
| 5,189,732 A | 2/1993 | Kondo | |
| 5,194,862 A | 3/1993 | Edwards | 341/20 |
| 5,212,555 A | 5/1993 | Stoltz | |
| 5,224,861 A | 7/1993 | Glass et al. | 434/35 |
| 5,227,985 A | 7/1993 | DeMenthon | |
| 5,241,308 A | 8/1993 | Young | 341/34 |
| 5,252,951 A | 10/1993 | Tannenbaum et al. | 345/156 |
| 5,266,931 A | 11/1993 | Tanaka | |
| 5,272,470 A * | 12/1993 | Zetts | G06F 3/04883 178/19.01 |
| 5,281,966 A | 1/1994 | Walsh | 341/22 |
| 5,297,041 A | 3/1994 | Kushler et al. | 364/419.15 |
| 5,305,017 A | 4/1994 | Gerpheide | 345/174 |
| 5,319,386 A | 6/1994 | Gunn et al. | |
| 5,328,190 A | 7/1994 | Dart et al. | |
| 5,345,543 A | 9/1994 | Capps et al. | 395/137 |
| 5,347,295 A | 9/1994 | Agulnick et al. | |
| 5,347,629 A | 9/1994 | Barrett et al. | |
| 5,367,453 A | 11/1994 | Capps et al. | |
| 5,374,787 A | 12/1994 | Miller et al. | |
| 5,376,948 A | 12/1994 | Roberts | 345/173 |
| 5,379,057 A | 1/1995 | Clough et al. | |
| 5,398,310 A | 3/1995 | Tchao et al. | 395/144 |
| 5,412,189 A | 5/1995 | Cragun | |
| 5,418,760 A | 5/1995 | Kawashima et al. | |
| 5,422,656 A | 6/1995 | Allard et al. | |
| 5,437,044 A | 7/1995 | Hohner et al. | |
| 5,442,742 A | 8/1995 | Greyson et al. | 395/146 |
| 5,459,793 A | 10/1995 | Naoi et al. | |
| 5,463,388 A | 10/1995 | Boie et al. | 341/33 |
| 5,463,696 A | 10/1995 | Beernink et al. | 382/186 |
| 5,463,725 A | 10/1995 | Henckel et al. | |
| 5,471,578 A | 11/1995 | Moran et al. | |
| 5,479,528 A | 12/1995 | Speeter | |
| 5,483,261 A | 1/1996 | Yasutake | |
| 5,488,204 A | 1/1996 | Mead et al. | |
| 5,495,077 A | 2/1996 | Miller et al. | 178/18 |
| 5,495,269 A | 2/1996 | Elrod et al. | |
| 5,495,576 A | 2/1996 | Ritchey | |
| 5,502,514 A | 3/1996 | Vogeley et al. | |
| 5,510,806 A | 4/1996 | Busch | |
| 5,511,148 A | 4/1996 | Wellner | |
| 5,513,309 A | 4/1996 | Meier et al. | 395/155 |
| 5,515,079 A | 5/1996 | Hauck | |
| 5,523,775 A | 6/1996 | Capps | 345/179 |
| 5,530,455 A | 6/1996 | Gillick et al. | 345/163 |
| 5,530,456 A | 6/1996 | Kokubo | |
| 5,543,590 A | 8/1996 | Gillespie et al. | 178/18 |
| 5,543,591 A | 8/1996 | Gillespie et al. | 178/18 |
| 5,548,667 A | 8/1996 | Tu | |
| 5,559,301 A | 9/1996 | Bryan, Jr. et al. | |
| 5,563,632 A | 10/1996 | Roberts | 345/173 |
| 5,563,996 A | 10/1996 | Tchao | 395/144 |
| 5,565,658 A | 10/1996 | Gerpheide et al. | 178/19 |
| 5,565,888 A | 10/1996 | Selker | |
| 5,565,894 A | 10/1996 | Bates et al. | 345/178 |
| 5,568,604 A | 10/1996 | Hansen | |
| 5,572,239 A | 11/1996 | Jaeger | |
| 5,572,647 A | 11/1996 | Blades | |
| 5,579,036 A | 11/1996 | Yates, IV | 345/173 |
| 5,581,243 A | 12/1996 | Ouellette et al. | |
| 5,581,681 A | 12/1996 | Tchao et al. | 395/804 |
| 5,583,946 A | 12/1996 | Gourdol | 382/187 |
| 5,589,856 A | 12/1996 | Stein et al. | |
| 5,590,219 A | 12/1996 | Gourdol | 382/202 |
| 5,592,566 A | 1/1997 | Pagallo et al. | 382/187 |
| 5,594,469 A | 1/1997 | Freeman et al. | |
| 5,594,810 A | 1/1997 | Gourdol | 382/187 |
| 5,596,694 A | 1/1997 | Capps | 395/152 |
| 5,612,719 A | 3/1997 | Beernink et al. | 345/173 |
| 5,613,913 A | 3/1997 | Ikematsu et al. | |
| 5,625,715 A | 4/1997 | Trew et al. | |
| 5,627,567 A | 5/1997 | Davidson | |
| 5,631,805 A | 5/1997 | Bonsall | 361/681 |
| 5,633,955 A | 5/1997 | Bozinovic et al. | 381/187 |
| 5,634,102 A | 5/1997 | Capps | 395/334 |
| 5,636,101 A | 6/1997 | Bonsall et al. | 361/681 |
| 5,642,108 A | 6/1997 | Gopher et al. | 341/22 |
| 5,644,657 A | 7/1997 | Capps et al. | 382/229 |
| 5,649,706 A | 7/1997 | Treat, Jr. et al. | |
| 5,657,049 A | 8/1997 | Ludolph et al. | |
| 5,666,113 A | 9/1997 | Logan | 341/34 |
| 5,666,502 A | 9/1997 | Capps | 345/352 |
| 5,666,552 A | 9/1997 | Greyson et al. | 395/802 |
| 5,675,361 A | 10/1997 | Santilli | 345/168 |
| 5,675,362 A | 10/1997 | Clough et al. | |
| 5,677,710 A | 10/1997 | Thompson-Rohrlich | 345/173 |
| 5,689,253 A | 11/1997 | Hargreaves et al. | 341/22 |
| 5,689,667 A * | 11/1997 | Kurtenbach | 715/810 |

(56) References Cited

U.S. PATENT DOCUMENTS

| | | | |
|---|---|---|---|
| 5,694,562 A | 12/1997 | Fisher | |
| 5,709,219 A | 1/1998 | Chen et al. | |
| 5,710,844 A | 1/1998 | Capps et al. | 382/317 |
| 5,712,661 A | 1/1998 | Jaeger | |
| 5,726,685 A | 3/1998 | Kuth et al. | |
| 5,729,249 A | 3/1998 | Yasutake | |
| 5,729,250 A | 3/1998 | Bishop et al. | 345/175 |
| 5,730,165 A | 3/1998 | Philipp | 137/1 |
| 5,736,974 A | 4/1998 | Selker | 345/146 |
| 5,736,975 A | 4/1998 | Lunetta | |
| 5,736,976 A | 4/1998 | Cheung | 345/168 |
| 5,741,990 A | 4/1998 | Davies | 84/423 R |
| 5,745,116 A | 4/1998 | Pisutha-Arnond | 345/358 |
| 5,745,716 A | 4/1998 | Tchao et al. | 395/350 |
| 5,745,719 A | 4/1998 | Falcon | |
| 5,746,818 A | 5/1998 | Yatake | |
| 5,748,184 A | 5/1998 | Shieh | |
| 5,748,269 A | 5/1998 | Harris et al. | 349/58 |
| 5,748,512 A | 5/1998 | Vargas | 364/709.12 |
| 5,757,358 A | 5/1998 | Osga | |
| 5,764,222 A | 6/1998 | Shieh | 345/173 |
| 5,767,457 A | 6/1998 | Gerpheide et al. | 178/18 |
| 5,767,842 A | 6/1998 | Korth | 345/168 |
| 5,777,603 A | 7/1998 | Jaeger | |
| 5,790,104 A | 8/1998 | Shieh | 345/173 |
| 5,790,107 A | 8/1998 | Kasser et al. | 345/174 |
| 5,798,760 A | 8/1998 | Vayda et al. | |
| 5,801,941 A | 9/1998 | Bertram | 364/188 |
| 5,802,516 A | 9/1998 | Shwarts et al. | 707/6 |
| 5,805,145 A | 9/1998 | Jaeger | |
| 5,805,146 A | 9/1998 | Jaeger et al. | |
| 5,805,167 A * | 9/1998 | van Cruyningen | 715/808 |
| 5,808,567 A | 9/1998 | McCloud | 341/20 |
| 5,808,604 A | 9/1998 | Robin | |
| 5,808,605 A | 9/1998 | Shieh | |
| 5,809,267 A | 9/1998 | Moran et al. | 395/358 |
| 5,818,451 A | 10/1998 | Bertram et al. | 345/354 |
| 5,821,690 A | 10/1998 | Martens et al. | 313/506 |
| 5,821,930 A | 10/1998 | Hansen | 345/340 |
| 5,823,782 A | 10/1998 | Marcus et al. | 434/156 |
| 5,825,232 A | 10/1998 | Kimura | |
| 5,825,308 A | 10/1998 | Rosenberg | |
| 5,825,351 A | 10/1998 | Tam | 345/173 |
| 5,825,352 A | 10/1998 | Bisset et al. | |
| 5,831,601 A | 11/1998 | Vogeley et al. | |
| 5,835,079 A | 11/1998 | Shieh | |
| 5,841,428 A | 11/1998 | Jaeger et al. | |
| 5,844,506 A | 12/1998 | Binstead | |
| 5,844,547 A | 12/1998 | Minakuchi et al. | |
| 5,850,218 A | 12/1998 | LaJoie et al. | |
| 5,854,625 A | 12/1998 | Frisch et al. | 345/173 |
| 5,856,822 A * | 1/1999 | Du et al. | 345/73 |
| 5,859,631 A | 1/1999 | Bergman et al. | |
| 5,867,149 A | 2/1999 | Jaeger | |
| 5,870,091 A | 2/1999 | Lazarony et al. | |
| 5,871,251 A | 2/1999 | Welling et al. | |
| 5,874,948 A | 2/1999 | Shieh | |
| 5,877,751 A | 3/1999 | Kanemitsu et al. | |
| 5,880,411 A | 3/1999 | Gillespie et al. | |
| 5,883,619 A | 3/1999 | Ho et al. | |
| 5,886,697 A | 3/1999 | Naughton et al. | |
| 5,898,434 A | 4/1999 | Small et al. | 345/348 |
| 5,900,876 A | 5/1999 | Yagita et al. | |
| 5,910,800 A | 6/1999 | Shields et al. | |
| 5,914,716 A | 6/1999 | Rubin et al. | |
| 5,920,309 A | 7/1999 | Bisset et al. | |
| 5,923,319 A | 7/1999 | Bishop et al. | 345/175 |
| 5,933,134 A | 8/1999 | Shieh | 345/173 |
| 5,936,613 A | 8/1999 | Jaeger et al. | |
| 5,943,043 A | 8/1999 | Furuhata et al. | |
| 5,943,044 A | 8/1999 | Martinelli et al. | 345/174 |
| 5,943,052 A | 8/1999 | Allen et al. | |
| 5,943,053 A | 8/1999 | Ludolph et al. | |
| 5,949,345 A | 9/1999 | Beckert et al. | |
| 5,956,291 A | 9/1999 | Nehemiah et al. | |
| 5,956,822 A | 9/1999 | Brieden et al. | |
| 5,963,671 A | 10/1999 | Comerford et al. | 382/230 |
| 5,974,541 A | 10/1999 | Hall et al. | |
| 5,977,867 A | 11/1999 | Blouin | |
| 5,982,302 A | 11/1999 | Ure | |
| 5,982,352 A | 11/1999 | Pryor | |
| 5,982,353 A | 11/1999 | Gallery et al. | |
| 5,982,355 A | 11/1999 | Jaeger et al. | |
| 5,995,101 A | 11/1999 | Clark et al. | |
| 5,995,104 A | 11/1999 | Kataoka et al. | |
| 5,995,106 A | 11/1999 | Naughton et al. | |
| 5,999,895 A | 12/1999 | Forest | 704/1 |
| 6,002,389 A | 12/1999 | Kasser | 345/173 |
| 6,002,808 A | 12/1999 | Freeman | 382/288 |
| 6,005,549 A | 12/1999 | Forest | |
| 6,005,555 A | 12/1999 | Katsurahira et al. | |
| 6,008,800 A | 12/1999 | Pryor | |
| 6,013,956 A | 1/2000 | Anderson, Jr. | |
| 6,020,881 A | 2/2000 | Naughton et al. | 345/327 |
| 6,028,271 A | 2/2000 | Gillespie et al. | |
| 6,031,524 A | 2/2000 | Kunert | 345/173 |
| 6,034,685 A | 3/2000 | Kuriyama et al. | |
| 6,037,882 A | 3/2000 | Levy | 341/20 |
| 6,040,824 A | 3/2000 | Maekawa et al. | 345/173 |
| 6,046,722 A | 4/2000 | McKiel, Jr. | |
| 6,049,326 A | 4/2000 | Beyda et al. | 345/157 |
| 6,049,328 A | 4/2000 | Vanderheiden | |
| 6,050,825 A | 4/2000 | Nichol et al. | 434/227 |
| 6,052,339 A | 4/2000 | Frenkel et al. | 368/230 |
| 6,054,984 A | 4/2000 | Alexander | |
| 6,054,990 A | 4/2000 | Tran | |
| 6,057,540 A | 5/2000 | Gordon et al. | |
| 6,057,845 A | 5/2000 | Dupouy | |
| 6,061,177 A | 5/2000 | Fujimoto | |
| 6,066,075 A | 5/2000 | Poulton | |
| 6,072,494 A | 6/2000 | Nguyen | 345/358 |
| 6,073,036 A | 6/2000 | Heikkinen et al. | 455/575 |
| 6,075,531 A | 6/2000 | DeStefano | |
| 6,084,576 A | 7/2000 | Leu et al. | 345/168 |
| 6,088,019 A | 7/2000 | Rosenberg | |
| 6,094,197 A * | 7/2000 | Buxton et al. | 715/863 |
| 6,104,384 A | 8/2000 | Moon et al. | |
| 6,105,419 A | 8/2000 | Michels et al. | |
| 6,107,997 A | 8/2000 | Ure | 345/173 |
| 6,128,003 A | 10/2000 | Smith et al. | 345/157 |
| 6,130,665 A | 10/2000 | Ericsson | |
| 6,131,299 A | 10/2000 | Raab et al. | 33/503 |
| 6,135,958 A | 10/2000 | Mikula-Curtis et al. | 600/443 |
| 6,144,380 A | 11/2000 | Shwarts et al. | 345/350 |
| 6,151,596 A | 11/2000 | Hosomi | |
| 6,154,194 A | 11/2000 | Singh | |
| 6,154,201 A | 11/2000 | Levin et al. | |
| 6,154,209 A | 11/2000 | Naughton et al. | |
| 6,160,551 A | 12/2000 | Naughton et al. | |
| 6,169,538 B1 | 1/2001 | Nowlan et al. | 345/168 |
| 6,175,610 B1 | 1/2001 | Peter | |
| 6,188,391 B1 | 2/2001 | Seely et al. | |
| 6,198,515 B1 | 3/2001 | Cole | 348/836 |
| 6,208,329 B1 | 3/2001 | Ballare | 345/173 |
| 6,219,035 B1 | 4/2001 | Skog | |
| 6,222,465 B1 | 4/2001 | Kumar et al. | 341/20 |
| 6,222,531 B1 | 4/2001 | Smith | |
| 6,239,790 B1 | 5/2001 | Martinelli et al. | 345/174 |
| 6,243,071 B1 | 6/2001 | Shwarts et al. | 345/146 |
| 6,246,862 B1 | 6/2001 | Grivas et al. | 455/90 |
| 6,249,606 B1 | 6/2001 | Kiraly et al. | 382/195 |
| 6,255,604 B1 | 7/2001 | Tokioka et al. | |
| 6,256,020 B1 | 7/2001 | Pabon et al. | |
| 6,259,436 B1 | 7/2001 | Moon et al. | 345/173 |
| 6,271,835 B1 | 8/2001 | Hoeksma | 345/168 |
| 6,278,441 B1 | 8/2001 | Gouzman et al. | |
| 6,278,443 B1 | 8/2001 | Amro et al. | |
| 6,288,707 B1 | 9/2001 | Philipp | 345/168 |
| 6,289,326 B1 | 9/2001 | LaFleur | 705/702 |
| 6,292,178 B1 | 9/2001 | Bernstein et al. | 345/173 |
| 6,292,179 B1 | 9/2001 | Lee | |
| 6,295,049 B1 | 9/2001 | Minner | |
| 6,295,052 B1 | 9/2001 | Kato et al. | 345/179 |
| 6,308,144 B1 | 10/2001 | Bronfeld et al. | |

(56) References Cited

U.S. PATENT DOCUMENTS

| | | |
|---|---|---|
| 6,310,610 B1 | 10/2001 | Beaton et al. |
| 6,313,853 B1 | 11/2001 | Lamontagne et al. |
| 6,323,846 B1 | 11/2001 | Westerman et al. |
| 6,323,849 B1 | 11/2001 | He et al. .................... 345/173 |
| 6,326,956 B1 | 12/2001 | Jaeger et al. |
| 6,333,753 B1 | 12/2001 | Hinckley |
| 6,337,678 B1 | 1/2002 | Fish |
| 6,339,748 B1 | 1/2002 | Hiramatsu |
| 6,344,861 B1 | 2/2002 | Naughton et al. |
| 6,347,290 B1 | 2/2002 | Bartlett ...................... 702/150 |
| 6,359,572 B1 | 3/2002 | Vale .............................. 341/23 |
| 6,359,632 B1 | 3/2002 | Eastty et al. |
| 6,377,009 B1 | 4/2002 | Philipp ......................... 318/468 |
| 6,380,931 B1 | 4/2002 | Gillespie et al. ............. 345/173 |
| 6,400,379 B1 | 6/2002 | Johnson et al. |
| 6,411,287 B1 | 6/2002 | Scharff et al. ................ 345/177 |
| 6,414,671 B1 | 7/2002 | Gillespie et al. ............. 345/157 |
| 6,414,672 B2 | 7/2002 | Rekimoto et al. |
| 6,414,674 B1 | 7/2002 | Kamper et al. |
| 6,421,042 B1 | 7/2002 | Omura et al. |
| 6,421,046 B1 | 7/2002 | Edgren |
| 6,421,234 B1 | 7/2002 | Ricks et al. .................. 361/683 |
| 6,424,338 B1* | 7/2002 | Anderson .................... 345/173 |
| 6,429,846 B2 | 8/2002 | Rosenberg et al. |
| 6,433,801 B1 | 8/2002 | Moon et al. |
| 6,441,806 B1 | 8/2002 | Jaeger |
| 6,441,807 B1 | 8/2002 | Yamaguchi |
| 6,442,440 B1 | 8/2002 | Miller |
| 6,448,977 B1 | 9/2002 | Braun et al. |
| 6,452,514 B1 | 9/2002 | Philipp ........................... 341/33 |
| 6,456,952 B1 | 9/2002 | Nathan ........................... 702/94 |
| 6,457,355 B1 | 10/2002 | Philipp ........................... 73/304 |
| 6,457,834 B1 | 10/2002 | Cotton et al. |
| 6,466,036 B1 | 10/2002 | Philipp ......................... 324/678 |
| 6,469,722 B1 | 10/2002 | Kinoe et al. .................. 345/837 |
| 6,473,069 B1 | 10/2002 | Gerpheide |
| 6,473,102 B1 | 10/2002 | Rodden et al. |
| 6,478,432 B1 | 11/2002 | Dyner |
| 6,480,188 B1 | 11/2002 | Horsley |
| 6,481,851 B1 | 11/2002 | McNelley et al. |
| 6,489,978 B1 | 12/2002 | Gong et al. |
| 6,501,464 B1 | 12/2002 | Cobbley et al. |
| 6,501,515 B1 | 12/2002 | Iwamura |
| 6,515,669 B1 | 2/2003 | Mohri ........................... 345/474 |
| 6,525,749 B1 | 2/2003 | Moran et al. ................. 345/863 |
| 6,535,200 B2 | 3/2003 | Philipp ......................... 345/168 |
| 6,543,684 B1 | 4/2003 | White et al. .................. 234/379 |
| 6,543,947 B2 | 4/2003 | Lee ............................... 400/489 |
| 6,545,670 B1 | 4/2003 | Pryor |
| 6,563,487 B2 | 5/2003 | Martin et al. |
| 6,563,492 B1 | 5/2003 | Furuya |
| 6,570,557 B1 | 5/2003 | Westerman et al. .......... 345/173 |
| 6,570,584 B1 | 5/2003 | Cok et al. |
| 6,573,844 B1 | 6/2003 | Venolia et al. ................. 341/22 |
| 6,583,676 B2 | 6/2003 | Krah et al. |
| 6,593,916 B1 | 7/2003 | Aroyan ......................... 345/173 |
| 6,597,345 B2 | 7/2003 | Hirshberg ..................... 345/168 |
| 6,610,936 B2 | 8/2003 | Gillespie et al. ........... 178/18.01 |
| 6,611,252 B1 | 8/2003 | DuFaux |
| 6,624,833 B1 | 9/2003 | Kumar et al. ................. 345/863 |
| 6,639,577 B2 | 10/2003 | Eberhard ...................... 345/102 |
| 6,650,319 B1 | 11/2003 | Hurst et al. ................... 345/173 |
| 6,654,733 B1 | 11/2003 | Goodman et al. ............. 706/52 |
| 6,658,994 B1 | 12/2003 | McMillan ...................... 99/468 |
| 6,661,920 B1 | 12/2003 | Skinner |
| 6,664,989 B1 | 12/2003 | Snyder et al. |
| 6,670,894 B2 | 12/2003 | Mehring ......................... 341/22 |
| 6,677,932 B1 | 1/2004 | Westerman ................... 345/173 |
| 6,677,933 B1 | 1/2004 | Yogaratnam |
| 6,677,934 B1 | 1/2004 | Blanchard .................... 345/173 |
| 6,680,677 B1 | 1/2004 | Tiphane |
| 6,690,387 B2 | 2/2004 | Zimmerman et al. |
| 6,697,721 B2 | 2/2004 | Arlinsky |
| 6,703,999 B1 | 3/2004 | Iwanami et al. |
| 6,710,771 B1 | 3/2004 | Yamaguchi et al. |
| 6,721,784 B1 | 4/2004 | Leonard et al. |
| 6,724,366 B2 | 4/2004 | Crawford ..................... 345/157 |
| 6,757,002 B1 | 6/2004 | Oross et al. ................... 345/864 |
| 6,760,020 B1 | 7/2004 | Uchiyama et al. |
| 6,791,467 B1 | 9/2004 | Ben-Ze'ev |
| 6,795,059 B2 | 9/2004 | Endo ............................ 345/173 |
| 6,798,768 B1 | 9/2004 | Gallick et al. |
| 6,803,905 B1 | 10/2004 | Capps et al. .................. 345/173 |
| 6,803,906 B1 | 10/2004 | Morrison et al. ............. 345/173 |
| 6,806,869 B2 | 10/2004 | Yamakado |
| 6,819,312 B2 | 11/2004 | Fish |
| 6,822,635 B2 | 11/2004 | Shahoian et al. |
| 6,842,672 B1 | 1/2005 | Straub et al. ...................... 701/3 |
| 6,856,259 B1 | 2/2005 | Sharp ................................ 341/5 |
| 6,857,800 B2 | 2/2005 | Zhang et al. .................. 400/473 |
| 6,874,129 B2 | 3/2005 | Smith |
| 6,882,641 B1 | 4/2005 | Gallick et al. |
| 6,888,536 B2 | 5/2005 | Westerman et al. .......... 345/173 |
| 6,896,375 B2 | 5/2005 | Peterson et al. |
| 6,900,795 B1 | 5/2005 | Knight, III et al. ........... 345/173 |
| 6,903,730 B2 | 6/2005 | Mathews et al. |
| 6,920,619 B1 | 7/2005 | Milekic |
| 6,926,609 B2 | 8/2005 | Martin ............................ 463/36 |
| 6,927,761 B2 | 8/2005 | Badaye et al. ................ 345/173 |
| 6,930,661 B2 | 8/2005 | Uchida et al. |
| 6,942,571 B1 | 9/2005 | McAllister et al. ............. 463/20 |
| 6,944,591 B1 | 9/2005 | Raghunandan |
| 6,952,203 B2 | 10/2005 | Banerjee et al. |
| 6,954,583 B2 | 10/2005 | Nagasaka et al. |
| 6,954,899 B1 | 10/2005 | Anderson |
| 6,958,749 B1 | 10/2005 | Matsushita et al. |
| 6,961,912 B2 | 11/2005 | Aoki et al. |
| 6,965,375 B1 | 11/2005 | Gettemy et al. .............. 345/173 |
| 6,970,749 B1 | 11/2005 | Chinn et al. |
| 6,972,401 B2 | 12/2005 | Akitt et al. .................... 250/221 |
| 6,972,749 B2 | 12/2005 | Hinckley et al. |
| 6,975,304 B1* | 12/2005 | Hawkins et al. .............. 345/168 |
| 6,977,666 B1 | 12/2005 | Hedrick |
| 6,985,801 B1 | 1/2006 | Straub et al. ...................... 701/3 |
| 6,992,659 B2 | 1/2006 | Gettemy ....................... 345/173 |
| 7,015,894 B2 | 3/2006 | Morohoshi |
| 7,030,863 B2 | 4/2006 | Longe et al. |
| 7,031,228 B2 | 4/2006 | Born et al. ...................... 368/69 |
| 7,038,659 B2 | 5/2006 | Rajkowski .................... 345/156 |
| 7,057,607 B2 | 6/2006 | Mayoraz et al. .............. 345/173 |
| 7,058,902 B2 | 6/2006 | Iwema et al. |
| 7,075,512 B1 | 7/2006 | Fabre et al. ................... 345/156 |
| 7,079,114 B1 | 7/2006 | Smith et al. |
| 7,084,859 B1 | 8/2006 | Pryor |
| 7,091,410 B2 | 8/2006 | Ito et al. |
| 7,098,891 B1 | 8/2006 | Pryor |
| 7,098,896 B2 | 8/2006 | Kushler et al. ................ 345/168 |
| 7,100,105 B1 | 8/2006 | Nishimura et al. |
| 7,129,416 B1 | 10/2006 | Steinfeld et al. |
| 7,143,355 B2 | 11/2006 | Yamaguchi et al. |
| 7,149,981 B1 | 12/2006 | Lundy et al. |
| 7,158,123 B2 | 1/2007 | Myers et al. |
| 7,180,502 B2 | 2/2007 | Marvit et al. |
| 7,184,064 B2 | 2/2007 | Zimmerman et al. |
| 7,194,699 B2 | 3/2007 | Thomson et al. ............. 715/823 |
| 7,233,316 B2 | 6/2007 | Smith et al. |
| 7,233,319 B2 | 6/2007 | Johnson et al. |
| 7,240,289 B2 | 7/2007 | Naughton et al. |
| 7,242,311 B2 | 7/2007 | Hoff et al. |
| 7,260,422 B2 | 8/2007 | Knoedgen |
| 7,310,781 B2 | 12/2007 | Chen et al. |
| 7,319,454 B2 | 1/2008 | Thacker et al. |
| 7,320,112 B2 | 1/2008 | Yamaguchi et al. |
| RE40,153 E | 3/2008 | Westerman et al. |
| 7,339,580 B2 | 3/2008 | Westerman et al. |
| 7,340,077 B2 | 3/2008 | Gokturk et al. |
| 7,340,685 B2 | 3/2008 | Chen et al. |
| 7,346,853 B2 | 3/2008 | Chen et al. |
| 7,417,681 B2 | 8/2008 | Lieberman et al. |
| 7,443,316 B2 | 10/2008 | Lim ................................ 341/22 |
| 7,466,843 B2 | 12/2008 | Pryor |
| 7,474,772 B2 | 1/2009 | Russo et al. |
| 7,475,390 B2 | 1/2009 | Berstis et al. |
| 7,477,240 B2 | 1/2009 | Yanagisawa ................... 345/173 |

(56) References Cited

U.S. PATENT DOCUMENTS

| | | | |
|---|---|---|---|
| 7,478,336 B2 | 1/2009 | Chen et al. | |
| 7,489,303 B1 | 2/2009 | Pryor | |
| 7,509,113 B2 | 3/2009 | Knoedgen | |
| 7,515,810 B2 | 4/2009 | Nagasaka et al. | |
| 7,526,738 B2 | 4/2009 | Ording et al. | 715/862 |
| 7,614,008 B2 | 11/2009 | Ording | |
| 7,663,607 B2 | 2/2010 | Hotelling et al. | |
| 7,664,748 B2 | 2/2010 | Harrity | |
| 7,683,889 B2 | 3/2010 | Rimas Ribikauskas et al. | |
| 7,694,231 B2 | 4/2010 | Kocienda et al. | 715/773 |
| 7,706,616 B2* | 4/2010 | Kristensson et al. | 382/187 |
| 7,714,849 B2 | 5/2010 | Pryor | |
| 7,746,325 B2 | 6/2010 | Roberts | |
| 7,831,932 B2 | 11/2010 | Josephsoon et al. | |
| 7,856,472 B2 | 12/2010 | Arav | |
| 7,861,188 B2 | 12/2010 | Josephsoon et al. | |
| 7,877,705 B2 | 1/2011 | Chambers et al. | |
| 7,898,529 B2* | 3/2011 | Fitzmaurice et al. | 345/173 |
| 8,239,784 B2 | 8/2012 | Hotelling et al. | |
| 2001/0012001 A1 | 8/2001 | Rekimoto et al. | |
| 2001/0012022 A1 | 8/2001 | Smith | |
| 2001/0012769 A1 | 8/2001 | Sirola et al. | |
| 2001/0015718 A1 | 8/2001 | Hinckley et al. | |
| 2001/0026678 A1 | 10/2001 | Nagasaka et al. | |
| 2001/0040554 A1 | 11/2001 | Nakagawa | |
| 2001/0055038 A1 | 12/2001 | Kim | |
| 2002/0015024 A1 | 2/2002 | Westerman et al. | 345/173 |
| 2002/0044132 A1 | 4/2002 | Fish | |
| 2002/0044161 A1 | 4/2002 | Sugai | |
| 2002/0051018 A1 | 5/2002 | Yeh | 345/784 |
| 2002/0054175 A1 | 5/2002 | Miettinen et al. | |
| 2002/0075317 A1 | 6/2002 | Dardick | |
| 2002/0080123 A1 | 6/2002 | Kennedy et al. | |
| 2002/0085037 A1 | 7/2002 | Leavitt et al. | |
| 2002/0097229 A1* | 7/2002 | Rose et al. | G06F 1/626 345/173 |
| 2002/0113778 A1 | 8/2002 | Rekimoto et al. | |
| 2002/0118848 A1 | 8/2002 | Karpenstein | 381/119 |
| 2002/0120543 A1 | 8/2002 | Brittingham et al. | |
| 2002/0130839 A1 | 9/2002 | Wallace et al. | |
| 2002/0133522 A1 | 9/2002 | Greetham et al. | |
| 2002/0135615 A1 | 9/2002 | Lang | 345/764 |
| 2002/0140633 A1 | 10/2002 | Rafii et al. | |
| 2002/0140668 A1 | 10/2002 | Crawford | |
| 2002/0140679 A1 | 10/2002 | Wen | 345/168 |
| 2002/0140680 A1 | 10/2002 | Lu | 345/169 |
| 2002/0167545 A1 | 11/2002 | Kang et al. | 345/780 |
| 2002/0180763 A1 | 12/2002 | Kung et al. | |
| 2002/0191029 A1 | 12/2002 | Gillespie et al. | |
| 2002/0196227 A1 | 12/2002 | Surloff et al. | |
| 2002/0196238 A1 | 12/2002 | Tsukada et al. | |
| 2002/0196274 A1 | 12/2002 | Comfort et al. | |
| 2003/0001899 A1 | 1/2003 | Partanen et al. | |
| 2003/0005454 A1 | 1/2003 | Rodriguez et al. | |
| 2003/0006974 A1 | 1/2003 | Clough et al. | 345/179 |
| 2003/0016253 A1 | 1/2003 | Aoki et al. | |
| 2003/0030664 A1 | 2/2003 | Parry | |
| 2003/0063073 A1 | 4/2003 | Geaghan et al. | 345/173 |
| 2003/0071850 A1 | 4/2003 | Geidl | |
| 2003/0071858 A1 | 4/2003 | Morohoshi | |
| 2003/0072077 A1 | 4/2003 | Peterson et al. | |
| 2003/0073461 A1 | 4/2003 | Sinclair | |
| 2003/0076301 A1 | 4/2003 | Tsuk et al. | 345/159 |
| 2003/0076303 A1 | 4/2003 | Huppi | 345/163 |
| 2003/0076306 A1 | 4/2003 | Zadesky et al. | 345/173 |
| 2003/0076363 A1 | 4/2003 | Murphy | |
| 2003/0095095 A1 | 5/2003 | Pihlaja | 345/156 |
| 2003/0095096 A1 | 5/2003 | Robbin et al. | 345/156 |
| 2003/0095135 A1 | 5/2003 | Kaasila et al. | |
| 2003/0098858 A1 | 5/2003 | Perski et al. | 345/173 |
| 2003/0128188 A1 | 7/2003 | Wilbrink et al. | |
| 2003/0128195 A1 | 7/2003 | Banerjee et al. | |
| 2003/0132950 A1 | 7/2003 | Surucu | |
| 2003/0152241 A1 | 8/2003 | Eastty et al. | |
| 2003/0160808 A1 | 8/2003 | Foote et al. | |
| 2003/0164820 A1 | 9/2003 | Kent | |
| 2003/0169303 A1 | 9/2003 | Islam et al. | |
| 2003/0179201 A1 | 9/2003 | Thacker | |
| 2003/0193481 A1 | 10/2003 | Sokolsky | |
| 2003/0197736 A1* | 10/2003 | Murphy | 345/780 |
| 2003/0201972 A1 | 10/2003 | Usuda | |
| 2003/0206202 A1 | 11/2003 | Moriya | 345/846 |
| 2003/0210260 A1 | 11/2003 | Palmer et al. | |
| 2003/0210286 A1 | 11/2003 | Gerpheide et al. | |
| 2003/0214534 A1 | 11/2003 | Uemura et al. | |
| 2003/0234768 A1 | 12/2003 | Rekimoto et al. | 345/169 |
| 2003/0237043 A1 | 12/2003 | Novak et al. | |
| 2004/0001048 A1 | 1/2004 | Kraus et al. | |
| 2004/0009788 A1 | 1/2004 | Mantyjarvi et al. | 455/550.1 |
| 2004/0019505 A1 | 1/2004 | Bowman et al. | |
| 2004/0021643 A1 | 2/2004 | Hoshino et al. | |
| 2004/0021644 A1 | 2/2004 | Enomoto | |
| 2004/0021696 A1 | 2/2004 | Molgaard | |
| 2004/0036622 A1 | 2/2004 | Dukach et al. | |
| 2004/0046887 A1 | 3/2004 | Ikehata et al. | |
| 2004/0053661 A1 | 3/2004 | Jones et al. | |
| 2004/0056837 A1 | 3/2004 | Koga et al. | |
| 2004/0056839 A1 | 3/2004 | Yoshihara | |
| 2004/0056849 A1 | 3/2004 | Lohbihler et al. | |
| 2004/0064473 A1 | 4/2004 | Thomas et al. | |
| 2004/0080529 A1 | 4/2004 | Wojcik | |
| 2004/0100479 A1 | 5/2004 | Nakano et al. | |
| 2004/0108995 A1* | 6/2004 | Hoshino et al. | 345/173 |
| 2004/0119750 A1 | 6/2004 | Harrison | |
| 2004/0125081 A1 | 7/2004 | Hayakawa | |
| 2004/0134238 A1 | 7/2004 | Buckroyd et al. | |
| 2004/0135774 A1 | 7/2004 | La Monica | 345/174 |
| 2004/0135818 A1 | 7/2004 | Thomson et al. | |
| 2004/0136564 A1 | 7/2004 | Roeber et al. | |
| 2004/0140956 A1* | 7/2004 | Kushler et al. | 345/168 |
| 2004/0141157 A1 | 7/2004 | Ramachandran et al. | |
| 2004/0145601 A1 | 7/2004 | Brielmann et al. | |
| 2004/0146688 A1 | 7/2004 | Treat | |
| 2004/0150668 A1 | 8/2004 | Myers et al. | |
| 2004/0150669 A1 | 8/2004 | Sabiers et al. | |
| 2004/0155888 A1 | 8/2004 | Padgitt et al. | |
| 2004/0160419 A1 | 8/2004 | Padgitt | 345/173 |
| 2004/0165924 A1 | 8/2004 | Griffin | 400/486 |
| 2004/0178994 A1 | 9/2004 | Kairls, Jr. | 345/173 |
| 2004/0181749 A1* | 9/2004 | Chellapilla et al. | 715/505 |
| 2004/0183833 A1 | 9/2004 | Chua | 345/773 |
| 2004/0189720 A1 | 9/2004 | Wilson et al. | |
| 2004/0198463 A1 | 10/2004 | Knoedgen | |
| 2004/0218963 A1 | 11/2004 | Van Diepen et al. | 400/472 |
| 2004/0227739 A1 | 11/2004 | Tani et al. | |
| 2004/0227830 A1 | 11/2004 | Kobayashi et al. | |
| 2004/0230912 A1 | 11/2004 | Clow et al. | |
| 2004/0237052 A1 | 11/2004 | Allport | |
| 2004/0245352 A1 | 12/2004 | Smith | |
| 2004/0262387 A1 | 12/2004 | Hart | |
| 2004/0263484 A1 | 12/2004 | Mantysalo et al. | 345/173 |
| 2005/0005241 A1 | 1/2005 | Hunleth et al. | |
| 2005/0012723 A1 | 1/2005 | Pallakoff | |
| 2005/0015731 A1 | 1/2005 | Mak et al. | |
| 2005/0016366 A1 | 1/2005 | Ito et al. | |
| 2005/0024341 A1 | 2/2005 | Gillespie et al. | 345/173 |
| 2005/0052425 A1 | 3/2005 | Zadesky et al. | 345/173 |
| 2005/0052427 A1 | 3/2005 | Wu et al. | |
| 2005/0057524 A1 | 3/2005 | Hill et al. | |
| 2005/0064936 A1 | 3/2005 | Pryor | |
| 2005/0066270 A1 | 3/2005 | Ali et al. | |
| 2005/0071771 A1 | 3/2005 | Nagasawa et al. | |
| 2005/0078087 A1 | 4/2005 | Gates et al. | |
| 2005/0091577 A1 | 4/2005 | Torres et al. | |
| 2005/0104867 A1 | 5/2005 | Westerman et al. | 345/173 |
| 2005/0110768 A1 | 5/2005 | Marriott et al. | 345/173 |
| 2005/0116941 A1 | 6/2005 | Wallington | |
| 2005/0120312 A1 | 6/2005 | Nguyen | |
| 2005/0132072 A1 | 6/2005 | Pennell et al. | |
| 2005/0134578 A1 | 6/2005 | Chambers et al. | |
| 2005/0162402 A1 | 7/2005 | Watanachote | |
| 2005/0169527 A1 | 8/2005 | Longe et al. | 382/177 |
| 2005/0171783 A1 | 8/2005 | Suominen | |
| 2005/0174975 A1 | 8/2005 | Mgrdechian et al. | |

(56) References Cited

U.S. PATENT DOCUMENTS

| | | |
|---|---|---|
| 2005/0190970 A1 | 9/2005 | Griffin ............... 382/209 |
| 2005/0204008 A1 | 9/2005 | Shinbrood |
| 2005/0204889 A1 | 9/2005 | Swingle et al. |
| 2005/0211766 A1 | 9/2005 | Robertson et al. |
| 2005/0223308 A1 | 10/2005 | Gunn et al. |
| 2005/0253816 A1 | 11/2005 | Himberg et al. ........ 345/173 |
| 2005/0253818 A1 | 11/2005 | Nettamo ............... 345/173 |
| 2005/0259087 A1 | 11/2005 | Hoshino et al. |
| 2005/0289476 A1 | 12/2005 | Tokkonen |
| 2006/0001650 A1 | 1/2006 | Robbins et al. |
| 2006/0007174 A1 | 1/2006 | Shen ..................... 345/173 |
| 2006/0010374 A1 | 1/2006 | Corrington et al. |
| 2006/0010400 A1 | 1/2006 | Dehlin et al. |
| 2006/0022955 A1 | 2/2006 | Kennedy |
| 2006/0022956 A1 | 2/2006 | Lengeling et al. ....... 345/173 |
| 2006/0026335 A1 | 2/2006 | Hodgson et al. |
| 2006/0026521 A1 | 2/2006 | Hotelling et al. |
| 2006/0026535 A1 | 2/2006 | Hotelling et al. ....... 715/863 |
| 2006/0026536 A1 | 2/2006 | Hotelling et al. ....... 715/863 |
| 2006/0031752 A1 | 2/2006 | Surloff et al. |
| 2006/0032680 A1 | 2/2006 | Elias et al. ............ 178/18.06 |
| 2006/0033724 A1 | 2/2006 | Chaudhri et al. ........ 345/173 |
| 2006/0035681 A1 | 2/2006 | Oh |
| 2006/0044259 A1 | 3/2006 | Hotelling et al. |
| 2006/0052885 A1 | 3/2006 | Kong ..................... 700/84 |
| 2006/0053387 A1 | 3/2006 | Ording ................... 715/773 |
| 2006/0066582 A1 | 3/2006 | Lyon et al. .............. 345/173 |
| 2006/0066590 A1 | 3/2006 | Ozawa et al. ........... 345/173 |
| 2006/0071915 A1 | 4/2006 | Rehm |
| 2006/0085757 A1 | 4/2006 | Andre et al. ............ 715/771 |
| 2006/0085767 A1* | 4/2006 | Hinckley et al. ........ 715/863 |
| 2006/0097991 A1 | 5/2006 | Hotelling et al. |
| 2006/0150120 A1 | 7/2006 | Dresti et al. |
| 2006/0161846 A1 | 7/2006 | Van Leeuwen ......... 715/702 |
| 2006/0161870 A1 | 7/2006 | Hotelling et al. |
| 2006/0161871 A1 | 7/2006 | Hotelling et al. |
| 2006/0167993 A1 | 7/2006 | Aaron et al. |
| 2006/0181517 A1 | 8/2006 | Zadesky et al. |
| 2006/0181519 A1 | 8/2006 | Vernier .................. 345/173 |
| 2006/0197750 A1 | 9/2006 | Hotelling et al. |
| 2006/0197753 A1 | 9/2006 | Hotelling |
| 2006/0232567 A1 | 10/2006 | Westerman et al. |
| 2006/0238517 A1 | 10/2006 | King et al. |
| 2006/0238518 A1 | 10/2006 | Westerman et al. |
| 2006/0238519 A1 | 10/2006 | Westerman et al. |
| 2006/0238520 A1 | 10/2006 | Westerman et al. |
| 2006/0238521 A1 | 10/2006 | Westerman et al. |
| 2006/0238522 A1 | 10/2006 | Westerman et al. |
| 2006/0242587 A1 | 10/2006 | Eagle et al. |
| 2006/0242607 A1* | 10/2006 | Hudson .................. 715/863 |
| 2006/0253793 A1* | 11/2006 | Zhai et al. .............. 715/773 |
| 2006/0265668 A1 | 11/2006 | Rainisto |
| 2006/0274051 A1 | 12/2006 | Longe et al. ............ 345/173 |
| 2006/0290921 A1 | 12/2006 | Hotelling et al. |
| 2007/0011603 A1 | 1/2007 | Makela |
| 2007/0033269 A1 | 2/2007 | Atkinson et al. |
| 2007/0061754 A1 | 3/2007 | Ardhanari et al. ....... 715/816 |
| 2007/0070050 A1 | 3/2007 | Westerman et al. |
| 2007/0070051 A1 | 3/2007 | Westerman et al. |
| 2007/0070052 A1 | 3/2007 | Westerman et al. |
| 2007/0078919 A1 | 4/2007 | Westerman et al. |
| 2007/0081726 A1 | 4/2007 | Westerman et al. |
| 2007/0083823 A1 | 4/2007 | Jaeger |
| 2007/0087766 A1 | 4/2007 | Hardy et al. |
| 2007/0088787 A1 | 4/2007 | Hardy et al. |
| 2007/0139395 A1 | 6/2007 | Westerman et al. |
| 2007/0159453 A1 | 7/2007 | Inoue |
| 2007/0171210 A1 | 7/2007 | Chaudhri et al. |
| 2007/0177803 A1 | 8/2007 | Elias et al. |
| 2007/0177804 A1 | 8/2007 | Elias et al. |
| 2007/0180360 A1 | 8/2007 | Neil |
| 2007/0222768 A1 | 9/2007 | Geurts et al. |
| 2007/0229464 A1 | 10/2007 | Hotelling et al. |
| 2007/0236466 A1 | 10/2007 | Hotelling |
| 2007/0247429 A1 | 10/2007 | Westerman |
| 2007/0257890 A1 | 11/2007 | Hotelling et al. |
| 2007/0268273 A1 | 11/2007 | Westerman et al. |
| 2007/0268274 A1 | 11/2007 | Westerman et al. |
| 2007/0268275 A1 | 11/2007 | Westerman et al. |
| 2007/0276875 A1 | 11/2007 | Brunswig et al. |
| 2008/0016468 A1 | 1/2008 | Chambers et al. |
| 2008/0024459 A1 | 1/2008 | Poupyrev et al. |
| 2008/0024463 A1 | 1/2008 | Pryor |
| 2008/0036743 A1 | 2/2008 | Westerman et al. |
| 2008/0041639 A1 | 2/2008 | Westerman et al. |
| 2008/0042986 A1 | 2/2008 | Westerman et al. |
| 2008/0042987 A1 | 2/2008 | Westerman et al. |
| 2008/0042988 A1 | 2/2008 | Westerman et al. |
| 2008/0042989 A1 | 2/2008 | Westerman et al. |
| 2008/0088587 A1 | 4/2008 | Pryor |
| 2008/0128182 A1 | 6/2008 | Westerman et al. |
| 2008/0129707 A1 | 6/2008 | Pryor |
| 2008/0139297 A1 | 6/2008 | Beaulieu et al. |
| 2008/0174553 A1 | 7/2008 | Trust |
| 2008/0189622 A1 | 8/2008 | Sanchez et al. |
| 2008/0211775 A1 | 9/2008 | Hotelling et al. |
| 2008/0211779 A1 | 9/2008 | Pryor |
| 2008/0211783 A1 | 9/2008 | Hotelling et al. |
| 2008/0211784 A1 | 9/2008 | Hotelling et al. |
| 2008/0211785 A1 | 9/2008 | Hotelling et al. |
| 2008/0229236 A1 | 9/2008 | Carrer et al. |
| 2008/0231610 A1 | 9/2008 | Hotelling et al. |
| 2008/0297476 A1 | 12/2008 | Hotelling et al. |
| 2008/0316183 A1 | 12/2008 | Westerman et al. ..... 345/173 |
| 2009/0021489 A1 | 1/2009 | Westerman et al. |
| 2009/0064006 A1 | 3/2009 | Naick et al. |
| 2009/0160816 A1 | 6/2009 | Westerman et al. |
| 2009/0167508 A1 | 7/2009 | Fadell et al. |
| 2009/0167567 A1 | 7/2009 | Fadell et al. |
| 2009/0167704 A1 | 7/2009 | Terlizzi et al. |
| 2009/0244031 A1 | 10/2009 | Westerman et al. |
| 2009/0244032 A1 | 10/2009 | Westerman et al. |
| 2009/0244033 A1 | 10/2009 | Westerman et al. |
| 2009/0249236 A1 | 10/2009 | Westerman et al. |
| 2009/0251435 A1 | 10/2009 | Westerman et al. |
| 2009/0251438 A1 | 10/2009 | Westerman et al. |
| 2009/0251439 A1 | 10/2009 | Westerman et al. |
| 2009/0267906 A1 | 10/2009 | Schroderus |
| 2009/0267921 A1 | 10/2009 | Pryor |
| 2009/0273563 A1 | 11/2009 | Pryor |
| 2009/0273574 A1 | 11/2009 | Pryor |
| 2009/0273575 A1 | 11/2009 | Pryor |
| 2009/0288044 A1 | 11/2009 | Matthews et al. |
| 2009/0300531 A1 | 12/2009 | Pryor |
| 2009/0322499 A1 | 12/2009 | Pryor |
| 2010/0149092 A1 | 6/2010 | Westerman et al. |
| 2010/0149134 A1 | 6/2010 | Westerman et al. |
| 2010/0231506 A1 | 9/2010 | Pryor |
| 2011/0209099 A1 | 8/2011 | Hinckley et al. |

FOREIGN PATENT DOCUMENTS

| | | | |
|---|---|---|---|
| DE | 100 59 906 | 6/2002 | |
| DE | 101 40 874 | 3/2003 | |
| DE | 102 51 296 | 5/2004 | ............. G06F 3/023 |
| EP | 0 394 614 A2 | 10/1990 | |
| EP | 0 422 577 A2 | 4/1991 | |
| EP | 0 422 577 A3 | 4/1991 | |
| EP | 0 462 759 A2 | 12/1991 | |
| EP | 0 462 759 A3 | 12/1991 | |
| EP | 0 462 759 B1 | 12/1991 | |
| EP | 0 288 692 | 7/1993 | ............. G06K 11/06 |
| EP | 0 588 210 | 3/1994 | |
| EP | 0588210 | 3/1994 | |
| EP | 0 622 722 A2 | 11/1994 | |
| EP | 0 622 722 A3 | 11/1994 | |
| EP | 0 622 722 B1 | 11/1994 | |
| EP | 0 664 504 | 1/1995 | ............. G06F 3/033 |
| EP | 0 464 908 | 9/1996 | ............. G06K 11/16 |
| EP | 0 817 000 A1 | 1/1998 | |
| EP | 0 817 000 B1 | 1/1998 | |
| EP | 0 880 090 A2 | 11/1998 | ............. G06F 3/033 |
| EP | 0 926 588 A2 | 6/1999 | |
| EP | 1 014 295 | 1/2002 | ............. G06K 11/06 |

(56) References Cited

FOREIGN PATENT DOCUMENTS

| | | | | |
|---|---|---|---|---|
| EP | 1 233 330 A2 | 8/2002 | | |
| EP | 1 271 295 A2 | 1/2003 | ............. | G06F 3/033 |
| EP | 1 517 228 A2 | 3/2005 | | |
| EP | 1 569 079 | 8/2005 | | |
| EP | 1 505 484 | 9/2005 | | |
| EP | 1 674 976 A2 | 6/2006 | ............... | G06F 3/00 |
| GB | 2 330 670 A | 4/1999 | | |
| GB | 2 332 293 A | 6/1999 | ............... | G06F 3/023 |
| GB | 2 337 349 A1 | 11/1999 | ............... | G06F 3/023 |
| GB | 2344894 | 6/2000 | | |
| GB | 2 351 639 A | 1/2001 | ............... | G06F 3/033 |
| GB | 2 380 583 A | 4/2003 | ............... | G06F 3/033 |
| GB | 2 402 105 A | 12/2004 | ............... | G06F 3/023 |
| JP | 60-198586 A | 10/1985 | | |
| JP | 63-167923 A | 7/1988 | | |
| JP | 04-048318 A | 2/1992 | | |
| JP | 04-054523 A | 2/1992 | | |
| JP | 04-198795 A | 7/1992 | | |
| JP | 05-297979 A | 11/1993 | | |
| JP | 06-161661 A | 6/1994 | | |
| JP | 7-129312 A | 5/1995 | | |
| JP | 7-230552 A | 8/1995 | | |
| JP | 9 033278 | 2/1997 | | |
| JP | 9-330175 A | 12/1997 | | |
| JP | 10039748 | 2/1998 | | |
| JP | 10 171600 | 6/1998 | | |
| JP | 10 269021 | 10/1998 | | |
| JP | 11 053093 A | 2/1999 | ............. | G06F 3/023 |
| JP | 11-073271 A | 3/1999 | | |
| JP | 11 085380 | 3/1999 | | |
| JP | 11 119911 | 4/1999 | | |
| JP | 11 126132 | 5/1999 | | |
| JP | 11-133816 A | 5/1999 | | |
| JP | 11-175258 A | 7/1999 | | |
| JP | 11-194863 A | 7/1999 | | |
| JP | 2000-010705 A | 1/2000 | | |
| JP | 2000-163031 A | 6/2000 | | |
| JP | 2000-163193 A | 6/2000 | | |
| JP | 2000-163444 A | 6/2000 | | |
| JP | 2000 231670 | 8/2000 | | |
| JP | 2001-134382 A | 5/2001 | | |
| JP | 2001-147918 A | 5/2001 | | |
| JP | 2001-230992 A | 8/2001 | | |
| JP | 2001-356870 A | 12/2001 | | |
| JP | 2002-034023 A | 1/2002 | | |
| JP | 2002-501271 A | 1/2002 | | |
| JP | 2002 108543 | 4/2002 | | |
| JP | 2002-342033 A | 11/2002 | | |
| JP | 2003-173237 A | 6/2003 | | |
| JP | 2004 038894 | 2/2004 | | |
| JP | 2004 110388 | 4/2004 | | |
| JP | 2006 146579 | 6/2006 | | |
| JP | 2000163193 | 6/2006 | | |
| KR | 10-2001-0040410 A | 5/2001 | | |
| KR | 4057131 | 7/2004 | | |
| WO | WO-94/29788 A1 | 12/1994 | | |
| WO | WO-92/02000 A1 | 2/1996 | | |
| WO | 97/18547 | 5/1997 | ............... | G09G 5/00 |
| WO | 97/23738 | 7/1997 | ............... | F16K 31/06 |
| WO | WO-97/36225 A1 | 10/1997 | | |
| WO | WO-97/40744 A1 | 11/1997 | | |
| WO | 98/14863 | 4/1998 | ............... | G06F 3/14 |
| WO | WO 98/33111 A1 | 7/1998 | ............... | G06F 3/023 |
| WO | 99/28813 | 6/1999 | | |
| WO | 99/38149 | 7/1999 | | |
| WO | 99/54807 | 10/1999 | | |
| WO | WO 99/54807 A1 | 10/1999 | ............... | G06F 3/033 |
| WO | 00/38042 | 6/2000 | | |
| WO | WO 00/38042 | 6/2000 | ............... | G06F 3/033 |
| WO | 01/02949 | 1/2001 | | |
| WO | 02/01482 | 1/2002 | | |
| WO | WO-02/39245 A2 | 5/2002 | | |
| WO | WO-02/39245 A3 | 5/2002 | | |
| WO | WO-02/39245 C2 | 5/2002 | | |
| WO | WO-03/027822 A2 | 4/2003 | | |
| WO | WO-03/027822 A3 | 4/2003 | | |
| WO | WO-03/036457 A2 | 5/2003 | | |
| WO | WO-03/036457 A3 | 5/2003 | | |
| WO | WO-03/062978 A2 | 7/2003 | | |
| WO | WO-03/062978 A3 | 7/2003 | | |
| WO | 03/088176 | 10/2003 | ............. | G08C 21/00 |
| WO | 03/098421 | 11/2003 | | |
| WO | WO 03/098417 A2 | 11/2003 | ............... | G06F 3/00 |
| WO | WO-2004/029789 A2 | 4/2004 | | |
| WO | WO-2004/029789 A3 | 4/2004 | | |
| WO | WO-2004/047069 A1 | 6/2004 | | |
| WO | WO 2004/051392 A2 | 6/2004 | | |
| WO | WO-2004/091956 A2 | 10/2004 | | |
| WO | WO-2004/091956 A3 | 10/2004 | | |
| WO | WO 2005/064442 A1 | 7/2005 | ............... | G06F 3/02 |
| WO | 2005/114369 | 12/2005 | | |
| WO | WO 2006/003590 A2 | 1/2006 | ............. | G06F 3/033 |
| WO | WO-2006/020304 A2 | 2/2006 | | |
| WO | WO-2006/020304 A3 | 2/2006 | | |
| WO | WO-2006/020305 A2 | 2/2006 | | |
| WO | WO-2006/020305 A3 | 2/2006 | | |
| WO | 2006/023569 | 3/2006 | ............. | G06F 3/044 |
| WO | 2006/026012 | 3/2006 | | |
| WO | WO-2007/037808 A1 | 4/2007 | | |
| WO | WO-2007/037809 A1 | 4/2007 | | |
| WO | WO-2007/089766 A2 | 8/2007 | | |
| WO | WO-2007/089766 A3 | 8/2007 | | |
| WO | WO-2008/094791 A2 | 7/2008 | | |
| WO | WO-2008/094791 A3 | 7/2008 | | |
| WO | WO-2010/135478 A2 | 11/2010 | | |

OTHER PUBLICATIONS

"5-Wire Resistive Touchscreens" obtained from http://www.touchscreens.com/intro-touchtypes-resistive.html generated Aug. 5, 2005.

"A Brief Overview of Gesture Recognition" obtained from http://www.dai.ed.ac.uk/Cvonline/LOCA_COPIES/COHEN/gesture_overview.html, generated Apr. 20, 2004.

"Capacitive Touchscreens" obtained from http://www.touchscreens.com/intro-touchtypes-capacitive.html generated Aug. 5, 2005.

"Capacitive Position Sensing" obtained from http://www.synaptics.com/technology/cps.cfm generated Aug. 5, 2005.

"Comparing Touch Technologies" obtained from http://wwww.touchscreens.com/intro-touchtypes.html generated Oct. 10, 2004.

"GlidePoint®" obtained from http://www.cirque.com/technology/technology_gp.html generated Aug. 5, 2005.

"How do touchscreen monitors know where you're touching?" obtained from http://www.electronics.howstuffworks.com/question716.html generated Aug. 5, 2005.

"How does a touchscreen work?" obtained from http://www.touchscreens.com/intro-anatomy.html generated Aug. 5, 2005.

"Infrared Touchscreens" obtained from http://www.touchscreens.com/intro-touchtypes-infrared.html generated Aug. 5, 2005.

"Mouse Emulation" FingerWorks obtained from http://www.fingerworks.com/gesture_guide_mouse.html generated Aug. 30, 2005.

"Mouse Gestures in Opera," (printed Apr. 20, 2004), http://www.opera.com.reatures/mouse/.

"Mouse Gestures in Opera" obtained from http://www.opera.com/products/desktop/mouse/index.dml generated Aug. 30, 2005.

"Mouse Gestures," Optim oz, May 21, 2004.

"MultiTouch Overview" FingerWorks obtained from http://www.fingerworks.com/multoverview.html generated Aug. 30, 2005.

"Near Field Imaging Touchscreens" obtained from http://www.touchscreens.com/intro-touchtypes-nfi.html generated Aug. 5, 2005.

"PenTouch Capacitive Touchscreens" obtained from http://www.touchscreens.com/intro-touchtypes-pentouch.html generated Aug. 5, 2005.

"Surface Acoustic Wave Touchscreens" obtained from http://www.touchscreens.com/intro-touchtypes-saw.html generated Aug. 5, 2005.

"Symbol Commander" obtained from http://www.sensiva.com/symbolcomander/, generated Aug. 30, 2005.

(56) References Cited

OTHER PUBLICATIONS

"Tips for Typing" FingerWorks http://www.fingerworks.com/mini_typing.html generated Aug. 30, 2005.
"Touch Technologies Overview" 2001, 3M Touch Systems, Massachusetts.
"Touch Technologies: Touch is Everywhere," (printed Aug. 30, 2005), httn://www.3m.com/3MTouchSystems/downloads/PDFs/TouchTechOV.pdf.
"Wacom Components—Technology" obtained from http://www.wacom-components.com/english/tech.asp generated on Oct. 10, 2004.
"Watershed Algorithm" http://rsb.info.nih.gov/ij/plugins/watershed.html generated Aug. 5, 2005.
"FingerWorks—Gesture Guide—Application Switching," obtained from http://www.fingerworks.com/gesture_guide_apps.html, generated on Aug. 27, 2004, 1-pg.
"FingerWorks—Gesture Guide—Editing," obtained from http://www.fingerworks.com/gesure_guide_editing.html, generated on Aug. 27, 2004, 1-pg.
"FingerWorks—Gesture Guide—File Operations," obtained from http://www.fingerworks.com/gesture_guide_files.html, generated on Aug. 27, 2004, 1-pg.
"FingerWorks—Gesture Guide—Text Manipulation," obtained from http://www.fingerworks.com/gesture_guide_text_manip.html, generated on Aug. 27, 2004, 2-pg.
"FingerWorks—Gesture Guide—Tips and Tricks," obtained from http://www.fingerworks.com/gesture_guide_tips.html, generated Aug. 27, 2004, 2-pgs.
"FingerWorks—Gesture Guide—Web," obtained from http://www.fingerworks.com/gesture_guide_web.html, generated on Aug. 27, 2004, 1-pg.
"FingerWorks—Guide to Hand Gestures for USB Touchpads," obtained from http://www.fingerworks.com/igesture_userguide.html, generated Aug. 27, 2004, 1-pg.
"FingerWorks—iGesture—Technical Details," obtained from http://www.fingerworks.com/igesture_tech.html, generated Aug. 27, 2004, 1-pg.
"FingerWorks—The Only Touchpads with Ergonomic Full-Hand Resting and Relaxation!" obtained from http://www.fingerworks.com/resting.html, Copyright 2001, 1-pg.
"FingerWorks—Tips for Typing on the Mini," obtained from http://www.fingerworks.com/mini_typing.html, generated on Aug. 27, 2004, 2-pgs.
"iGesture Pa—the MultiFinger USB TouchPad with Whole-Hand Gestures," obtained from http://www.fingerworks.com/igesture.html, generated Aug. 27, 2004, 2-pgs.
Bier, et al., "Toolglass and Magic Lenses: The see-through interface" In James Kijiya, editor, Computer Graphics (SIGGRAPH '93 Proceedings), vol. 27, pp. 73-80, Aug. 1993.
Chen, et al.; "Flowfield and Beyond: Applying Pressure-Sensitive Multi-Point Touchpad Interaction;" Multimedia and Expo, 2003, ICME '03, Proceedings, Jul. 9, 2003, pp. I-49-I52.
Douglas et al., *The Ergonomics of Computer Pointing Devices* (1997).
European Search Report received in EP 1 621 989 (@ *Beyer Weaver & Thomas, LLP*) dated Mar. 27, 2006.
Evb Elektronik "TSOP6238 IR Receiver Modules for Infrared Remote Control Systems" dated Jan. 2004 1-pg.
Fisher et al., "Repetitive Motion Disorders: The Design of Optimal Rate—Rest Profiles," Human Factors, 35(2):283-304 (Jun. 1993).
Fukumoto, et al., "ActiveClick: Tactile Feedback for Touch Panels," In CHI 2001 Summary, pp. 121-122, 2001.
Fukumoto and Yoshinobu Tonomura, "Body Coupled Fingering: Wireless Wearable Keyboard," *CHI 97*, pp. 147-154 (Mar. 1997).
Hardy, "Fingerworks" Mar. 7, 2002; BBC World on Line.
Hillier and Gerald J. Lieberman, *Introduction to Operations Research* (1986).
International Search Report dated Mar. 3, 2006 (PCT/US 05/03325).
Jacob et al., "Integrality and Separability of Input Devices," *ACM Transactions on Computer-Human Interaction*, 1:3-26 (Mar. 1994).
Jones; "MTC Express Multi-touch Controller;" Computer Music Journal 25.1, 2001, pp. 97-99.
Kinkley et al., "Touch-Sensing Input Devices," in CHI '99 Proceedings, pp. 223-230, 1999.
KIONX "KXP84 Series Summary Data Sheet" copyright 2005,dated Oct. 21, 2005, 4-pgs.
Lee et al., "A Multi-Touch Three Dimensional Touch-Sensitive Tablet," in CHI '85 Proceedings, pp. 121-128, 2000.
Lee, "A Fast Multiple-Touch-Sensitive Input Device," Master's Thesis, University of Toronto (1984).
Matsushita et al., "HoloWall: Designing a Finger, Hand, Body and Object Sensitive Wall," In Proceedings of UIST '97, Oct. 1997.
Quantum Research Group "QT510 / QWheel™ Touch Slider IC" copyright 2004-2005, 14-pgs.
Quek, "Unencumbered Gestural Interaction," *IEEE Multimedia*, 3:36-47 (Winter 1996).
Radwin, "Activation Force and Travel Effects on Overexertion in Repetitive Key Tapping," *Human Factors*, 39(1):130-140 (Mar. 1997).
Rekimoto "SmartSkin: An Infrastructure for Freehand Manipulation on Interactive Surfaces" CHI 2002, Apr. 20-25, 2002.
Rekimoto et al., "ToolStone: Effective Use of the Physical Manipulation Vocabularies of Input Devices," In Proc. of UIST 2000, 2000.
Rubine et al., "Programmable Finger-Tracking Instrument Controllers," *Computer Music Journal*, vol. 14, No. 1 (Spring 1990).
Rutledge et al., "Force-To-Motion Functions For Pointing," Human-Computer Interaction—INTERACT (1990).
Schiphorst, et al.; "Using a Gestural Interface Toolkit for Tactile Input to a Dynamic Virtual Space;" Conference on Human Factors in Computing Systems, Proceedings, Apr. 25, 2002, pp. 754-755.
Subatai Ahmad, "A Usable Real-Time 3D Hand Tracker," Proceedings of the 28$^{th}$ Asilomar Conference on Signals, Systems and Computers—Part 2 (of2), vol. 2 (Oct. 1994).
Texas Instruments "TSC2003 / I2C Touch Screen Controller" Data Sheet SBAS 162, dated Oct. 2001, 20-pgs.
Wellner, "The Digital Desk Calculators: Tangible Manipulation on a Desk Top Display" In ACM UIST '91 Proceedings, pp. 27-34, Nov. 1991.
Williams, "Applications for a Switched-Capacitor Instrumentation Building Block" Linear Technology Application Note 3, Jul. 1985, pp. 1-16.
Yamada et al., "A Switched-Capacitor Interface for Capacitive Pressure Sensors" IEEE Transactions on Instrumentation and Measurement, vol. 41, No. 1, Feb. 1992, pp. 81-86.
Yeh et al., "Switched Capacitor Interface Circuit for Capacitive Transducers" 1985 IEEE.
Zhai et al., "Dual Stream Input for Pointing and Scrolling," *Proceedings of CHI '97 Extended Abstracts* (1997).
Zimmerman et al., "Applying Electric Field Sensing to Human-Computer Interfaces," In CHI '85 Proceedings, pp. 280-287, 1995.
Annex to Form PCT/ISA/206 Communication Relating to the Results of the Partial International Search received in corresponding PCT Application No. PCT/US2005/025641 dated Feb. 19, 2007.
PCT International Search Report received in corresponding PCT Application No. PCT/US2006/031523 dated Feb. 27, 2007.
PCT International Search Report received in corresponding PCT Application No. PCT/US2005/025657 dated Feb. 26, 2007.
PCT International Search Report received in corresponding PCT Application No. PCT/US2006/031527 dated Feb. 27, 2007.
PCT International Search Report received in corresponding PCT Application No. PCT/US2006/031526 dated Feb. 14, 2007.
Office Action dated Sep. 17, 2008, for related U.S. Appl. No. 11/228,700.
Office Action dated May 12, 2009, for related U.S. Appl. No. 11/228,700.
Office Action dated Jul. 24, 2009, received in Australian Patent Application No. 2006295354, which corresponds to U.S. Appl. No. 11/228,700.
Casario, M., "Hands on Macromedia World: Touch Screen Keypad for Mobile Phone by DoCoMo," printed Nov. 18, 2005, 1 page, http://casario.blogs.com/mmworld/2005/10/touch_screen_ke.html.

(56) References Cited

OTHER PUBLICATIONS

Centroid, http://faculty,evansville.edu/ck6/tcenters/class/centroid.html, printed Apr. 28, 2006, 4 pages.
Day, B., "Will Cell Phones Render iPods Obsolete?" http://weblogs.javanet/pub/wig/883, printed Dec. 12, 2005, 3 pages.
Delta II™ Keypads, "Introducing the Ultimate Smartphone Keypad", http://www.chicagologic.com, printed Nov. 18, 2005, 2 pages.
DigitWireless, "Fastap™ Keypads Redefine Mobile Phones," http://www/digitwireless.com printed Nov. 18, 2005, 9 pages.
DigitWireless, "Fastap™," http://www.digitwireless.com/about/faq.html, Dec. 6, 2005, 5 pages.
O'Neal, "Smart Phones with Hidden Keyboards," printed Nov. 18, 2005, 3 pages, http://msc.com/4250-6452_16-6229969-1.html.
Phoneyworld, "You Heard of Touch Screens Now Check Out Touch Keys" printed Nov. 18, 2005, 2 pages, http://www.phoneyworld.com.
Sears et al., "Data Entry for Mobile Devices Using Soft Keyboards: Understanding the Effects of Keyboard Size and User Tasks," Abstract, Int'l Journal of Human-Computer Interaction, 2003, vol. 16, No. 2, 1 page.
Solutions for Humans, "Compare Keyboards with the Keyboard Compatibility Chart, Learn more About Alternative Keyboards," printed Dec. 8, 2005, 5 pages, http://www.keyalt.com/kkeybrdp.htm.
Sony Ericsson Mobile Communications AB: "P900 User Guide" XP002479719, [Online], Sep. 2003, pp. 8, 16,17,20, 24-26, 42-45, 137, 98 pages, http://www.sonyericcson.com/downloads/P900_UG_Rlb_EN.pdf.
"T9® Text Input for Keypad Devices," http://tegic.com.
Technology Loan Catalog, "Devices," printed Jun. 6, 2008, 9 pages, http://www.tsbvi.edu/outreach/techloan/catalog.html.
Textually, "LG Develops New Touch Pad Cell Phones" printed Nov. 18, 2005, 1 page, http://textually.org/textually/archives/2005/06/009903.htm.
Textually, "Microsoft New-Smart Phone Interface: Your Thumb," printed Nov. 18, 2005, 2 pages, http://www.textually.org.
Textually, "Samsung Releases Keyboard Phone in US," printed Nov. 18, 2005, 1 page, http://www.textually.org/textually/archives/2005/11/010482.htm.
WikiPodLinux, "Text Input Concepts," Dec. 2005, printed Jun. 17, 2008, 3 pages, http://web.archive.org/web/20051211165254/http://ipodlinux.org/Text_Input_Concepts.
WikiPodLinux, "Text Input (legacy)," downloaded Dec. 5, 2005, 8 pages, http://ipodlinux.org/Text_Input_%281egacy%29.
WikiPodLinux, "Text Input Methods," printed Dec. 5, 2005, 5 pages, http://ipodlinux.org/Text_Input_Methods.
WikiPodLinux, "Four-Button Keyboard," printed Dec. 5, 2005, 2 pages, http://ipodlinux.org/Four-Button_Keyboard.
Invitation to Pay Additional Fees dated Jan. 2, 2008, received in International Application No. PCT/US2007/060119, which corresponds to U.S. Appl. No. 11/459,606.
International Search Report and Written Opinion dated Apr. 11, 2008, received in International Application No. PCT/US2007/060119, which corresponds to U.S. Appl. No. 11/459,606.
Invitation to Pay Additional Fees dated Jun. 23, 2008, received in International Application No. PCT/US2007/088904, which corresponds to U.S. Appl. No. 11/961,663.
Office Action dated Oct. 10, 2008, received in European Patent Application No. 07 709 955.4, which corresponds to U.S. Appl. No. 11/459,606.
Office Action dated May 28, 2009, received in U.S. Appl. No. 11/459,606.
Office Action dated Jul. 31, 2009, received in European Patent Application No. 07 709 955.4, which corresponds to U.S. Appl. No. 11/459,606.
Office Action dated May 22, 2009, received in U.S. Appl. No. 11/459,615.
Final Office Action dated Dec. 8, 2009, received in U.S. Appl. No. 11/459,615.
Office Action dated Apr. 13, 2010, received in U.S. Appl. No. 11/459,615, 11 pages.
Office Action dated Jan. 29, 2010, received in Chinese Application for Invention No. 200680033890.X, which corresponds to U.S. Appl. No. 11/228,700.
Office Action dated Jan. 11, 2010, received in Korean Patent Application No. 10-2008-7006262, which corresponds to U.S. Appl. No. 11/228,700.
Office Action dated Aug. 16, 2010, received in Chinese Application No. 200780006621.9, which corresponds to U.S. Appl. No. 11/459,606.
Office Action dated Aug. 31, 2010, received in Korean Patent Application No. 10-2008-7019114, which corresponds to U.S. Appl. No. 11/459,606.
Office Action dated Nov. 18, 2010, received in U.S. Appl. No. 11/961,663.
Office Action dated Aug. 25, 2010, received in Korean Patent Application No. 10-2008-7006262, which corresponds to U.S. Appl. No. 11/228,700.
Notice of Acceptance dated Oct. 8, 2010, received in Australian Patent Application No. 2006295354, which corresponds to U.S. Appl. No. 11/228,700, 2 pages (Ording).
Office Action dated Dec. 15, 2011, received in European Patent Application No. 06801347.3, which corresponds to U.S. Appl. No. 11/228,700, 5 pages (Ording).
Office Action dated Feb. 28, 2011, received in Japanese Patent Application No. 2008 531107, which corresponds to U.S. Appl. No. 11/228,700, 3 pages (Ording).
Office Actgion dated Nov. 4, 2011, reveived in Japanese Patent Application No. 2005 531107, which corresponds to U.S. Appl. No. 11/228,700, 4 pages (Ording).
Office Action dated Dec. 11, 2010, reveived in Korean Patent Application No. 10-2010-7022243, which corresponds to U.S. Appl. No. 12/242,868, 3 pages (Ording).
Notice of Allowance dated Sep. 28, 2011, received in Koran Patent Application No. 10-2010-7022243, which corresponds to U.S. Appl. No. 11/228,700, 3 pages (Ording).
Anonymous. (2005), "iGesture Products for Everyone (Learn in Minutes)," *FingerWorks*, downloaded Aug. 30, 2005.
Anonymous. "Ai Squared Products—XoomText Magnifier," http://www/aisguared.com/Products/zoomtexturemag/index.cfm, downloaded Oct. 26, 2005.
Anonymous. "Ai Squared Products," http://aisquared.com/Products/index.cfm, downloaded Oct. 25, 2005.
Anonymous. "Gesture Recognition" http://www.fingerworks.com/gesture_recognition.html>, Jul. 2, 2006.
Anonymous. "Lunar Screen Magnifier and Lunar Plus Enhanced Screen Magnifier," www.dolphincomputeraccess.com/products/lunar.htm, downloaded Oct. 25, 2005.
Anonymous. "Touchscreen Technology Choices," http://www.elotouch.com/products/detech2.asp, downloaded Aug. 5, 2005.
Anonymous "Visual Disabilities," http://depts.stoc.edu/ods/ACCESS/bpvisual.htm, downloaded Oct. 25, 2005,
Anonymous. (2011). "Jog Dial" located at http://www.ask.com/wiki/Jog_dial, last visited Feb. 27, 2011, two pages.
Anonymous. (Apr. 1, 1994). "Jog Shuttle Graphical," *IBM Technical Disclosure Bulletin*, 37(4A):47-48.
Anonymous. (2011). "(graphical or virtual) (jog dial) or (jog wheel) or (scroll wheel)," Ask Search located at http://www.ask.com/web?q=%28graphical+or+virtual%29++%28jog+job+dial%29+or+%28jo . . . , last visited Feb. 27, 2011, two pages.
Anonymous. (2011). "What Is a Jog Wheel?" As Search located at http://www.ask.com/web?q=what+is+a+jog+wheel&search=qsrc=0&o=0&1=dirlast visited on Feb. 27, 2011, two pages.
Anonymous. (2012) "Emulating Mouse Scroll Wheel?" Ask Search located at http://www.ask.com/web?q=emulate+scroll+wheel&qsrc=1&o=0&1=dir&qid=A23E49EA, last visited Mar. 23, 2012, one page.
Anonymous (2012). "Virtual Scroll Wheel," Ask Search located at http://www.ask.com/web?virtual+scroll+wheel&qsrc=0&o=0&1=dir&oo=0, last visited Mar. 23, 2012, two pages.
Bales, J W. et al. (Apr. 1981). "Marking Parts to Aid Robot Vision," NASA Technical Paper 1819, 37 pages.

(56) References Cited

OTHER PUBLICATIONS

Buxton. W. et al. (Jul. 22, 1985). "Issues and Techniques in Touch-Sensitive Tablet Input," *Proceedings ACM Siggraph*, pp. 215-224.
Chang, C-C. et al. (Aug. 1,1993). "A Hashing-Oriented Nearest Neighbor Searching Scheme," *Pattern Recogrnition Letter*, 14(8):625-630.
Crowley, J.L. (Mar. 1, 1997). "Vision for Man-Machine Interaction," *Robotics and Autonomous Systems*, 19(3-4):347-358.
Davis, J. et al. (May 2. 1994) "Recognizing Hand Gestures," *European Conference on Computer Vision*, Berlin, DE, 1:331-340.
Davis, J. et al. (Oct. 31, 1994). "Determining 3-D Hand Motlon," *Signals, Systems and Computers, 1994 Conference Record of the 28$^{th}$ Asilomer Conference on Pacific Grove*, CA, Oct. 31-Nov. 2, 1994, Los Alamitos, CA. pp, 1262-1266.
European examination report for European Patent Application No. 06016830.9, mailed Aug. 6, 2008.
European examination report for European Patent Application No. 06015856 4 mailed Sep. 16, 2008.
European examination report for uropean patent Application No. 99904228.6, mailed Apr. 20, 2006.
European examination report for European Patent Application No. 99904228.6, mailed Mar. 23, 2007.
European search eport for European Patent Application No. 06016830.9 mailed Dec. 3, 2007.
European Search Report mailed Dec. 12, 2008, for EP Application No. 06016855.6 filed Jan. 25, 1999, six pages.
European Search Report mailed Dec. 13, 2007, for EP Application No. 05772892 5. filed Jul. 19, 2005, three pages.
European Search Report mailed Dec. 15. 2008, for EP Appiication No. 08016449.4, filed Jul. 19, 2005, six pages.
European Search Report mailed Dec. 15, 2008, for EP Application No. 08016450.2, filed Jul. 19, 2005, six pages.
European Search Report mailed Dec. 23, 2008, for EP Application No. 06016831.7 filed Jan. 25, 1999, seven pages.
European Search Report mailed Jan. 9, 2009, for EP Application No. 06016832.6 filed Jan. 26, 1999. four pages.
European Search Report mailed Jun. 8, 2012, for EP Application No. 12166818.0. filed Jan. 30, 2007, seven pages.
European Search Report mailed Jun. 14, 2012, for EP Application No. 12166820.6, filed Jan. 30,2007, six pages.
European supplementary search report for European Patent Application No. 99904228.6, mailed Feb. 16, 2005.
Extended European search report for European Patent Application No. 06016858.0, mailed Dec. 21, 2007.
Extended European search report for European Patent Application No. 06016856.4, mailed Mar. 14, 2008.
Final Office Action mailed Dec. 20, 2007, for U.S. Appl. No. 10/927,925, filed Aug. 26, 2004, 25 pages.
Final Office Action mailed May 21, 2008, for U.S. Appl. No. 11/048,264, filed Jan. 31, 2005, 11 pages.
Final Office Action mailed Oct. 16, 2008, for U.S. Appl. No. 11/038,590, filed Jan. 8 2005, 35 pages.
Final Office Action mailed Nov. 10, 2008, for U.S. Appl. No. 10/927,925, filed Aug. 26, 2004, 22 pages.
Final Office Action mailed Dec. 23, 2008, for U.S. Appl. No. 10/903,964, flied Jul. 30, 2004, 12 pages.
Final Office Action mated Dec. 24, 2008, for U.S. Appl. No. 11/240,788, filed Sep. 30, 2005, 12 pages.
Final Office Action mailed Mar. 5, 2009, for U.S. Appl. No. 11/228,758, filed Sep. 16, 2005, 15 pages.
Final Office Action mailed Mar. 17, 2009, for U.S. Appl. No. 11/241,839, filed Sep. 30, 2005, 16 pages.
Final Office Action mailed Mar. 19, 2009, for U.S. Appl. No. 11/428,506, filed Jul. 3, 2006, seven pages.
Final Office Action mailed Jul. 7, 2009, for U.S. Appl. No. 11/048,264, filed Jan. 31, 2005, 14 pages.
Final Office Action mailed Nov. 12, 2009, for U.S. Appl. No. 11/349,350, filed Feb. 8, 2006, nine pages.
Final Office Action mated Nov. 19, 2009, for U.S. Appl. No. 11/428,515, filed Jul. 3, 2006. 14 pages.
Final Office Action mailed Dec. 31, 2009, for U.S. Appl. No. 11/038,590, filed Jan. 18, 2005, 36 pages.
Final Office Action mailed Apr. 14, 2010, for U.S. Appl. No. 11/559,736, filed Nov. 14, 2006, 11 pages.
Final Office Action mailed May 12, 2010, for U.S. Appl. No. 11/428,503, filed Jul. 3, 2006, 12 pages.
Final Office Action mailed Jun. 4, 2010, for U.S. Appl. No. 10/903,964, filed Jul. 30, 2004, 22 pages.
Final Office Action mailed Jun. 11, 2010, for U.S. Appl. No. 11/559,833, filed Nov. 14, 2006, eight pages.
Final Office Action mailed Jul. 6, 2010, for U.S. Appl. No. 11/048,264, filed Jan. 31, 2005, 12 pages.
Final Office Action mailed Jul. 19, 2010, for U.S. Appl. No. 11/428,522, filed Jul. 3, 2006, six pages.
Final Office Action mailed Jul. 20, 2010, for U.S. Appl. No. 11/228,758, filed Sep. 16, 2005, 19 pages.
Final Office Action mailed Aug. 17, 2010, for U.S. Appl. No. 11/240,788, filed Sep. 30, 2005, nine pages.
Final Office Action mailed Sep. 2, 2010, for U.S. Appl. No. 11/272,868, filed Nov. 15, 2005, nine pages.
Final Office Action mailed Oct. 19, 2010, for U.S. Appl. No. 11/559,799, filed Nov. 14, 2006, eight pages.
Final Office Action mailed Oct. 29, 2010, for U.S. Appl. No. 11/559,763, filed Nov. 14, 2006, 15 pages.
Final Office Action mailed Nov. 23, 2010, for U.S. Appl. No. 11/696,693, filed Apr. 4, 2007, 24 pages.
Final Office Action mailed Nov. 23, 2010, for U.S. Appl. No. 11/830,801, filed Jul. 30, 2007, 13 pages.
Final Office Action mailed Nov. 26, 2010, for U.S. Appl. No. 11/830,793, filed Jul. 30, 2007, nine pages.
Final Office Action mailed Dec. 2, 2010, for U.S. Appl. No. 11/830,815, filed Jul. 30, 2007, nine pages.
Final Office Action mailed Dec. 3, 2010, for U.S. Appl. No. 11/830,788, filed Jul. 30, 2007, 15 pages.
Final Office Action mailed Jan. 19, 2011, for U.S. Appl. No. 11/980,721, filed Oct. 31, 2007, nine pages.
Final Office Action mailed Mar. 9, 2011, for U.S. Appl. No. 11/980,722, filed Oct. 31, 2007, 11 pages.
Final Office Action mailed Mar. 21, 2011, for U.S. Appl. No. 11/832,134, filed Aug. 1, 2007, 33 pages.
Final Office Action mailed Apr. 21, 2011, for U.S. Appl. No. 11/830,808, filed Jul. 30, 2007, 10 pages.
Final Office Action mailed May 11, 2011, for U.S. Appl. No. 11/048,264, filed Jan. 31, 2005, 12 pages.
Final Office Action mailed May 27, 2011, for U.S. Appl. No. 11/700,636, filed Jan. 30, 2007, nine pages.
Final Office Action mailed Aug. 10, 2011, for U.S. Appl. No. 11/240,788, filed Sep. 30, 2005, seven pages.
Final Office Action mailed Sep. 27, 2011, for U.S. Appl. No. 11/830,774, filed Jul. 30, 2007, 15 pages.
Final Office Action mailed Sep. 28, 2011, for U.S. Appl. No. 12/479,678, filed Jun. 5, 2009, 13 pages.
Final Office Action mailed Oct. 14, 2011, for U.S. Appl. No. 11/830,801, filed Jul. 30, 2007, 16 pages.
Final Office Action mailed Oct. 19, 2011, for U.S. Appl. No. 12/479,573, filed Jun. 5, 2009, 13 pages.
Final Office Action mailed Nov. 10, 2011, for U.S. Appl. No. 11/272,868, filed Nov. 15, 2005, nine pages.
Final Office Action mailed Nov. 17, 2011, for U.S. Appl. No. 11/830,781, filed Jul. 30 2007, 16 pages.
Final Office Action mailed Nov. 17, 2011, for U.S. Appl. No. 12/479,617, filed Jun. 5, 2009, 18 pages.
Final Office Action mailed Nov. 18, 2011, for U.S. Appl. No. 11/878,024, filed Jul. 20, 2007, 18 pages.
Final Office Action mailed Nov. 28, 2011, for U.S. Appl. No. 11/038,590, filed Jan. 18, 2005, 43 pages.
Final Office Action mailed Dec. 16, 2011, for U.S. Appl. No. 12/422,212, filed Apr. 10, 2009, 20 pages.
Final Office Action mailed Feb. 3, 2012, for U.S. Appl. No. 12/422,205, filed Apr. 10, 2009, 16 pages.
Final Office Action mailed Feb. 17, 2012, for U.S. Appl. No. 11/830,801, filed Jul. 30, 2007, 14 pages.

(56) References Cited

OTHER PUBLICATIONS

Final Office Action mailed Mar. 1, 2012, for U.S. Appl. No. 11/048,264, filed Jan. 31, 2005, 13 pages.
Final Office Action mailed Mar. 1, 2012, for U.S. Appl. No. 11/830,793, filed Jul. 30, 2007, 14 pages.
Final Office Action mailed Mar. 9, 2012, for U.S. Appl. No. 11/700,636, filed Jan. 30, 2007, nine pages.
Final Office Action mailed on Mar. 22, 2012, for U.S. Appl. No. 10/903,964, filed Jul. 30, 2004, 17 pages.
Final Office Action mailed Mar. 26, 2012, for U.S. Appl. No. 12/118,639, flied May 9, 2008, seven pages.
Final Office Action mailed Apr. 13, 2012, for U.S. Appl. No. 12/468,401, filed May 19, 2009, 21 pages.
Final Office Action mailed Apr. 16, 2012, for U.S. Appl. No. 12/422,222, filed Apr. 10, 2009, 14 pages.
Final Office Action mailed Apr. 25, 2012, for U.S. Appl. No. 12/422,197, filed Apr. 10, 2009, 12 pages.
Final Office Action mailed Apr. 27, 2012, for U.S. Appl. No. 11/830,788, filed Jul. 30, 2007, 13 pages.
Final Office Action mailed May 1, 2012, for U.S. Appl. No. 12/434,439, filed May 1, 2009, 14 pages.
Final Office Action mailed May 8, 2012, for U.S. Appl. No. 12/139,411, filed Jun. 13, 2008, seven pages.
Final Office Action mailed May 9, 2012, for U.S. Appl. No. 11/980,722, filed Oct. 31, 2007, 14 pages.
Final Office Action mailed May 24, 2012, for U.S. Appl. No. 11/830,757, filed Jul. 30, 2007, 19 pages.
Final Office Action mailed May 29, 2012, for U.S. Appl. No. 12/500,978, filed Jul. 10, 2009, 10 pages.
Final Office Action mailed Jun. 7, 2012, for U.S. Appl. No. 11/228,758, filed Sep. 16, 2005, 16 pages.
Final Office Action mailed Jun. 8, 2012, for U.S. Appl. No. 12/422,225, filed Apr. 10, 2009, 12 pages.
Final Office Action mailed Jul. 6, 2012, for U.S. Appl. No. 11/830,815, filed Jul. 30, 2007, 15 pages.
Final Office Action mailed Jul. 6, 2012, for U.S. Appl. No. 11/696,693, filed Apr. 4, 2007, 24 pages.
Final Office Action mailed Aug. 3, 2012, for U.S. Appl. No. 11/830,808, filed Jul. 30, 2007, seven pages.
Final Office Action mailed Sep. 18, 2012, for U.S. Appl. No. 11/852,690, filed Sep. 10, 2007, 13 pages.
Hardy, I. (Mar. 7, 2002). "Fingerworks."
Heap, T. et al. (Oct. 14, 1996). "Towards 3D Hand Tracking Using a Deformable Model,", *Proceedings of the 2nd International Conference*, Killington, VT, USA, Oct. 14-16, 1996, *Automatic face and Gesture Recognition, IEEE Comput. Soc* ., pp. 140-145.
International search report for PCT/US99/01454, mailed May 14, 1999.
International Search Report mailed Apr. 24, 2007 for PCT Application No. PCT/US2005/025641 filed Jul. 19, 2005, five pages.
International Search Report mailed Aug. 28, 2007, for PCT Application No. PCT/US2004/000701, filed Mar. 31, 2004, one page.
International Search Report mailed Aug. 11, 2008, for PCT Application No. PCT/US2007/002512 filed Jan. 30, 2007, three pages.
International Search Report and Written Opinion dated Sep. 15, 2008, received in International Application No. PCT/US2007/088904, which corresponds to U.S. Appl. No. 11/961,663.
International Search Report mailed Oct. 8, 2008, for PCT Application No. PCT/US2008/051727, filed Jan. 22, 2008, six pages.
Japanese Office Action mailed Oct. 27, 2008, for JP Patent Application No. 2007-523644, one page.
Kahney, L. (Mar. 8, 2004). "Pocket PCs Masquerade as IPods," available at: http://www.wired.com/gadgets/mac/news/2004/03/62543, last visited on Apr. 28, 2008, two pages.
Korean Office Action mailed May 17, 2008, for KR Application No. 10-2007-7005010, with English Translation, 15 pages.
Lee. S.K. et al. (Apr. 1985). "A Multi-Touch Three Dimensional Tough-Sensitive Tablet," *Proceeding of CHI: ACM Conference on Human Factors in Computing Systems*, pp. 21-25.
Malik, S. et al. (2004). "Visual Touchpad: A Two-Handed Gestural Input Device," *Proceedings of the 6th International Conference on Multimodal Interfaces*, State College, PA, Oct. 13-15, 2004, *ICMI '04, ACM* pp. 289-296.
Mohri, K. (Nov. 25, 2000). "Wearable Human Interface Based on Hand/Finger Gesture Recognition," *Human interface Association Magazine* 2(4):9-18. (Only Abstract in English.).
Nirei, K. et al. (Aug. 5, 1996). "Human Hand Tracking from Binocular Image Sequences," *Proceedings of the 1996 IEEE IECON 22nd International Conference*, Taipei, Taiwan, Aug. 5-10, 1996, *Industrial Electronics, Control and Instrumentation* 1(5):297-302.
Non-Final Office Action mailed Jul. 24, 2007, for U.S. Appl. No. 10/927,925, filed Aug. 26, 2004, 20 pages.
Non-Final Office Action mailed Sep. 21, 2007, for U.S. Appl. No. 11/428,515, filed Jul. 3, 2006, seven pages.
Non-final Office Action mailed Sep. 24, 2007, for U.S. Appl. No. 11/428,506, filed Jul. 3, 2006, six pages.
Non-Final Office Action mailed Sep. 24, 2007, for U.S. Appl. No. 11/428,521, filed Jul. 3, 2006, six pages.
Non-Final Office Action mailed Sep. 28, 2007, for U.S. Appl. No. 11/048,264, filed Jan. 31, 2005, 11 pages.
Non-Final Office Action mailed Nov. 1, 2007, for U.S. Appl. No. 11/240,788, filed Sep. 30, 2005, 20 pages.
Non-Final Office Action mailed Dec. 31, 2007, for U.S. Appl. No. 11/038,590, filed Jan. 18, 2005, 32 pages.
Non-Final Office Action mailed Jan. 28, 2008, for U.S. Appl. No. 11/428,522, filed Jul. 3, 2006, seven pages.
Non-Final Office Action mailed Feb. 4, 2008, for U.S. Appl. No. 11/428,515, filed Jul. 3, 2006, six pages.
Non-Final Office Action mailed Mar. 17, 2008, for U.S. Appl. No. 10/903,964, filed Jul. 30, 2004, 34 pages.
Non-Final Office Action mailed Apr. 30, 2008, for U.S. Appl. No. 11/240,788, filed Sep. 30, 2005, 12 pages.
Non-Final Office Action mailed May 5, 2008, for U.S. Appl. No. 10/927,925, filed Aug. 26, 2004, 22 pages.
Non-Final Office Action mailed Jul. 9, 2008, for U.S. Appl. No. 11/428,521, filed Jul. 3, 2006, 11 pages.
Non-Final Office Action mailed Sep. 2, 2008, for U.S. Appl. No. 11/428,522, filed Jul. 3, 2006, six pages.
Non-Final Office Action mailed Sep. 15, 2008, for U.S. Appl. No. 11/428,506, filed Jul. 3, 2006, eight pages.
Non-Final Office Action mailed Sep. 17, 2008, for U.S. Appl. No. 11/214,839, filed Sep. 30, 2005, 18 pages.
Non-Final Office Action mailed Sep. 17, 2008, for U.S. Appl. No. 11/288,700, filed Sep. 16, 2005, 18 pages.
Non-Final Office Action mailed Oct. 3, 2008, for U.S. Appl. No. 11/228,758, filed Sep. 16, 2005, 16 pages.
Non-Final Office Action mailed Oct. 31, 2008, for U.S. Appl. No. 11/428,515, filed Jul. 3, 2006, seven pages.
Non-Final Office Action mailed Dec. 11, 2008, for U.S. Appl. No. 11/048,264, filed Jan. 31, 2005, 11 pages.
Non-Final Office Action mailed Jan. 6, 2009, for U.S. Appl. No. 11/349,350, filed Feb. 8, 2006, 10 pages.
Non-Final Office Action mailed Feb. 17, 2009, for U.S. Appl. No. 11/428,522, filed Jul. 3, 2006, six pages.
Non-Final Office Action mailed Mar. 5, 2009, for U.S. Appl. No. 11/272,868, filed Nov. 15, 2005, 15 pages.
Non-Final Office Action mailed Mar. 18, 2009 for U.S. Appl. No. 11/428,515, filed Jul. 3, 2006, 12 pages.
Non-Final Office Action mailed Apr. 2, 2009, for U.S. Appl. No. 11/428,501, filed Jul. 3, 2006, 11 pages.
Non-Final Office Action mailed Apr. 2, 2009, for U.S. Appl. No. 11/428,503, filed Jul. 3, 2006, 12 pages.
Non-Final Office Action mailed Apr. 2, 2009, for U.S. Appl. No. 11/038,590, filed Jan. 18, 2005, 41 pages.
Non-Final Office Action mailed May 22, 2009, for U.S. Appl. No. 11/459,615, filed Jul. 24, 2006, nine pages.
Non-Final Office Action mailed Jun. 10, 2009, for U.S. Appl. No. 10/903,964, filed Jul. 30, 2004, 15 pages.
Non-Final Office Action mailed Jun. 10, 2009, for U.S. Appl. No. 11/240,788, filed Sep. 30, 2005, 13 pages.
Non-Final Office Action mailed Aug. 18, 2009, for U.S. Appl. No. 11/228,758, filed Sep. 16, 2005, 15 pages.

(56) References Cited

OTHER PUBLICATIONS

Non-Final Office Action mailed Aug. 25, 2009, for U.S. Appl. No. 11/428,522, flied Jul. 3, 2006, six pages.
Non-Final Office Action mailed Sep. 2, 2009, for U.S. Appl. No. 11/559,736, filed Nov. 14, 2006, 12 pages.
Non-Final Office Action mailed Oct. 5, 2009, for U.S. Appl. No. 11/559,799, filed Nov. 14, 2006, 14 pages.
Non-Final Office Action mailed Oct. 6, 2009, for U.S. Appl. No. 11/559,763, filed Nov. 14, 2006, 24 pages.
Non-Final Office Action mailed Oct. 14, 2009, for U.S. Appl. No. 11/428,501, filed Jul. 3, 2006, six pages.
Non-Final Office Action mailed Oct. 29, 2009, for U.S. Appl. No. 11/559,822, filed Nov. 14, 2006, 11 pages.
Non-Final Office Action mailed Oct. 30, 2009, for U.S. Appl. No. 11/428,503, filed Jul. 3, 2006, nine pages.
Non-Final Office Action mailed Dec. 7, 2009, for U.S. Appl. No. 11/272,868, filed Nov. 15, 2005, seven pages.
Non-Final Office Action mailed Dec. 18, 2009, for U.S. Appl. No. 11/048,264, filed Jan. 31, 2005, 11 pages.
Non-Final Office Action mailed Dec. 22, 2009, for U.S. Appl. No. 11/559,833, filed Nov. 14, 2006, six pages.
Non-Final Office Action mailed Dec. 24, 2009, for U.S. Appl. No. 11/677,958, filed Feb. 22, 2007, six pages.
Non-Final Office Action mailed Jan. 27, 2010, for U.S. Appl. No. 11/428,522, filed Jul. 3, 2006, five pages.
Non-Final Office Action mailed Feb. 3, 2010, for U.S. Appl. No. 11/228,758, filed Sep. 16, 2005, 20 pages.
Non-Final Office Action mailed Mar. 2, 2010, for U.S. Appl. No. 11/240,788, filed Sep. 30, 2005, 13 pages.
Non-Final Office Action mailed May 11, 2010, for U.S. Appl. No. 11830,788, filed Jul. 30, 2007, eight pages.
Non-Final Office Action mailed Jun. 8, 2010, for U.S. Appl. No. 11/696,693, filed Apr. 4, 2007, 27 pages.
Non-Final Office Action mailed Jun. 8, 2010, for U.S. Appl. No. 11/830,808, filed Jul. 30, 2007, 13 pages.
Non-Final Office Action mailed Jun. 9, 2010, for U.S. Appl. No. 11/830,793, filed Jul. 30, 2007, eight pages.
Non-Final Office Action mailed Jun. 10, 2010, for U.S. Appl. No. 11/830,801, filed Jul. 30, 2007, 10 pages.
Non-Final Office Action mailed Jun. 22, 2010, for U.S. Appl. No. 11/830,815, filed Jul. 30, 2007, 12 pages.
Non-Final Office Action mailed Jul. 29, 2010, for U.S. Appl. No. 11/980,721 filed Oct. 31, 2007, nine pages.
Non-Final Office Action mailed Aug. 2, 2010, for U.S. Appl. No. 11/980,722, filed Oct. 31, 2007, five pages.
Non-Final Office Action mailed Sep. 17, 2010, for U.S. Appl. No. 11/832,134, filed Aug. 1, 2007, 26 pages.
Non-Final Office Action mailed Oct. 29, 2010, for U.S. Appl. No. 11/048,264, filed Jan. 31, 2005, 12 pages.
Non-Final Office Action mailed Nov. 18, 2010, for U.S. Appl. No. 11/700,636, filed Jan. 30, 2007, eight pages.
Non-Final Office Action mailed Nov. 23, 2010, for U.S. Appl. No. 11/830,808, filed Jul. 30, 2007, 11 pages.
Non-Final Office Action mailed Jan. 20, 2011, for U.S. Appl. No. 11/830,757, filed Jul. 30, 2007, 21 pages.
Non-Final Office Action mailed Feb. 9, 2011, for U.S. Appl. No. 11/240,788, filed Sep. 30, 2005, nine pages.
Non-Final Office Action mailed Feb. 17, 2011, for U.S. Appl. No. 11/852,690, filed Sep. 10, 2007, 10 pages.
Non-Final Office Action mailed Feb. 17, 2011, for U.S. Appl. No. 11/830,766, filed Jul. 30, 2007, 20 pages.
Non-Final Office Action mailed Mar. 18, 2011, for U.S. Appl. No. 11/830,774, filed Jul. 30, 2007, 18 pages.
Non-Final Office Action mailed Mar. 21, 2011, for U.S. Appl. No. 11/830,801, filed Jul. 30, 2007, 11 pages.
Non-Final Office Action mailed Mar. 31, 2011, for U.S. Appl. No. 12/479,573, filed Jun. 5, 2009, 17 pages.
Non-Final Office Action mailed Mar. 31, 2011, for U.S. Appl. No. 12/479,617, filed Jun. 5, 2009, 20 pages.
Non-Final Office Action mailed Mar. 31, 2011, for U.S. Appl. No. 12/479,678, filed Jun. 5, 2009, 18 pages.
Non-Final Office Action mailed Apr. 4, 2011, for U.S. Appl. No. 11/272,868, filed Nov. 15, 2005, nine pages.
Non-Final Office Action mailed Apr. 21, 2011, for U.S. Appl. No. 11/559,763, filed Nov. 14, 2086, seven pages.
Non-Final Office Action mailed Apr. 28, 2011, for U.S. Appl. No. 11/830,781, filed Jul. 30, 2007, 16 pages.
Non-Final Office Action mailed Apr. 29, 2011, for U.S. Appl. No. 11/980,721, filed Oct. 31, 2007, 10 pages.
Non-Final Office Action mailed May 4, 2011, for U.S. Appl. No. 11/038,590, filed Jan. 18, 2005, 40 pages.
Non-Final Office Action mailed May 4, 2011, for U.S. Appl. No. 12/118,639, filed May 9, 2008, seven pages.
Non-Final Office Action mailed Jun. 7, 2011, for U.S. Appl. No. 11/878,024, filed Jul. 20, 2007, 10 pages.
Non-Final Office Action mailed Jun. 28, 2011, for U.S. Appl. No. 12/422,197, filed Apr. 10, 2009, 18 pages.
Non-Final Office Action mailed Jun. 28, 2011, for U.S. Appl. No. 12/422,205, filed Apr. 10, 2009, 13 pages.
Non-Final Office Action mailed Jun. 28, 2011, for U.S. Appl. No. 12/422,212, filed Apr. 10, 2009, 16 pages.
Non-Final Office Action mailed Jun. 29, 2011, for U.S. Appl. No. 12/342,027, filed Dec. 22, 2008, 32 pages.
Non-Final Office Action mailed Jul. 19, 2011, for U.S. Appl. No. 11/980,722, filed Oct. 31, 2007, 12 pages.
Non-Final Office Action mailed Jul. 20, 2011, for U.S. Appl. No. 11/830,788, filed Jul. 30, 2007, 12 pages.
Non-Final Office Action mailed Aug. 4, 2011, for U.S. Appl. No. 11/830,793, filed Jul. 30, 2007, 13 pages.
Non-Final Office Action mailed Aug. 5, 2011, for U.S. Appl. No. 12/422,222, filed Apr. 10, 2009, 15 pages.
Non-Final Office Action mailed Aug. 5, 2011, for U.S. Appl. No. 12/422,225, filed Apr. 10, 2009, 17 pages.
Non-Final Office Action mailed Sep. 1, 2011, for U.S. Appl. No. 11/830,766, filed Jul. 30, 2007, 29 pages.
Non-Final Office Action mailed Sep. 16, 2011, for U.S. Appl. No. 11/830,757, filed Jul. 30, 2007, 26 pages.
Non-Final Office Action mailed Sep. 23, 2011, for U.S. Appl. No. 12/500,973, filed Jul. 10, 2009, 5 pages.
Non-Final Office Action mailed Sep. 27, 2011, for U.S. Appl. No. 11/700,636, filed Jan. 30, 2007, eight pages.
Non-Final Office Action mailed Sep. 29, 2011, for U.S. Appl. No. 10/903,964, filed Jul. 30, 2004, 17 pages.
Non-Final Office Action mailed Sep. 29, 2011, for U.S. Appl. No. 11/048,264, filed Jan. 31, 2005, 11 pages.
Non-Final Office Action mailed Sep. 30, 2011, for U.S. Appl. No. 12/468,401, filed May 19, 2009, 19 pages.
Non-Final Office Action mailed Oct. 14, 2011, for U.S. Appl. No. 12/434,439, filed May 1, 2009, nine pages.
Non-Final Office Action mailed Oct. 27, 2011, for U.S. Appl. No. 12/139,411, filed Jun. 13, 2008, six pages.
Non-Final Office Action mailed Nov. 8, 2011, for U.S. Appl. No. 12/118,639, filed May 9, 2008, five pages.
Non-Final Office Action mailed Nov. 10, 2011, for U.S. Appl. No. 11/830,815, filed Jul. 30, 2007, 15 pages.
Non-Final Office Action mailed Nov. 23, 2011, for U.S. Appl. No. 11/428,515, filed Jul. 3, 2006, eight pages.
Non-Final Office Action mailed Dec. 8, 2011, for U.S. Appl. No. 11/228,758, filed Sep. 16, 2005, 16 pages.
Non-Final Office Action mailed Dec. 8, 2011, for U.S. Appl. No. 12/500,925, filed Jul. 10, 2009, nine pages.
Non-Final Office Action mailed Dec. 9, 2011, for U.S. Appl. No. 12/500,984, filed Jul. 10, 2009, nine pages.
Non-Final Office Action mailed Dec. 12, 2011, for U.S. Appl. No. 12/500,951, filed Jul. 10, 2009, eight pages.
Non-Final Office Action mailed Dec. 16, 2011, for U.S. Appl. No. 12/500,978, filed Jul. 10, 2009, nine pages.
Non-Final Office Action mailed Dec. 22, 2011, for U.S. Appl. No. 11/696,683, filed Apr. 4, 2007, 29 pages.
Non-Final Office Action mailed Jan. 19, 2012, for U.S. Appl. No. 11/830,808, filed Jul. 30, 2007, eight pages.

(56) References Cited

OTHER PUBLICATIONS

Non-Final Office Action mailed Jan. 30, 2012, for U.S. Appl. No. 11/428,503, filed Jul. 3, 2006, 15 pages.
Non-Final Office Action mailed Mar. 2, 2012, for U.S. Appl. No. 11/852,690, filed Sep. 10, 2007, 12 pages.
Non-Final Office Action mailed Apr. 5, 2012, for U.S. Appl. No. 12/479,678, filed Jun. 5, 2009, 13 pages.
Non-Final Office Action mailed Apr. 16, 2012, 2011, for U.S. Appl. No. 12/422,212, filed Apr. 10, 2009, 20 pages.
Non-Final Office Action mailed May 2, 2012, for U.S. Appl. No. 11/832,134, filed Oct. 31, 2007, 25 pages.
Non-Final Office Action mailed May 7, 2012, for U.S. Appl. No. 12/118,645, filed May 9, 2008, five pages.
Non-Final Office Action mailed May 9, 2012, for U.S. Appl. No. 12/118,641, filed May 9, 2008, four pages.
Non-Final Office Action mailed May 17, 2012, for U.S. Appl. No. 12/118,648, filed May 9, 2008, four pages.
Non Final Office Action mailed May 23, 2012, for U.S. Appl. No. 11/428,515, filed Jul. 3, 2006, 15 pages.
Non-Final Office Action mailed Jun. 7, 2012, for U.S. Appl. No. 11/830,766, filed Jul. 30, 2007, 14 pages.
Non-Final Office Action mailed Jun. 13, 2012, for U.S. Appl. No. 12/500,984, filed Jul. 10, 2009, eight pages.
Non-Final Office Action mailed Jun. 22, 2012, for U.S. Appl. No. 11/830.774, filed Jul. 30, 2007, 17 pages.
Non-Final Office Action mailed Jun. 25, 2012, for U.S. Appl. No. 11/830,781, filed Jul. 30, 2007, 19 pages.
Non-Final Office Action mailed Jun. 25, 2012, for U.S. Appl. No. 12/479,573, filed Jun. 5, 2009, 11 pages.
Non-Final Office Action mailed Jul. 27, 2012, for U.S. Appl. No. 12/118,659, filed May 9, 2008, five pages.
Non-Final Office Action mailed Jul. 31, 2012, for U.S. Appl. No. 11/228,758, filed Sep. 16, 2005, 14 pages.
Non-Final Office Action mailed Aug. 21, 2012, for U.S. Appl. No. 12/434,439, filed May 1, 2009, 12 pages.
Non-Final Office Action Mailed Aug. 30, 2012, for U.S. Appl. No. 11/830,801, filed Jul. 30, 2007, 15 pages.
Non-Final Office Action mailed Sep. 4, 2012, for U.S. Appl. No. 11/830,788, filed Jul. 30, 2007, 13 pages.
Non-Final Office Action mailed Sep. 6, 2012, for U.S. Appl. No. 11/830,793, filed Jul. 30, 2007, 14 pages.
Non-Final Office Action mailed Sep. 13, 2012, for U.S. Appl. No. 12/422,205, filed Apr. 10, 2009, 16 pages.
Non-Final Office Action mailed Sep. 25, 2012, for U.S. Appl. No. 11/428,515, filed Jul. 3, 2006, 15 pages.
Notice of Allowability mailed Feb. 11, 2009, for U.S. Appl. No. 11/428,521, filed Jul. 3, 2006, five pages.
Notice of Allowability mailed Jul. 10, 2009, for U.S. Appl. No. 11/428,521, filed Jul. 3, 2006, five pages.
Notice of Allowability mailed Sep. 2, 2009, for U.S. Appl. No. 11/428,506, filed Jul. 3, 2006, five pages.
Notice of Allowability mailed Sep. 3, 2009, for U.S. Appl. No. 11/241,839, filed Sep. 30, 2005, 10 pages.
Notice of Allowability (Supplemental) mailed May 12, 2010, for U.S. Appl. No. 11/559,822, filed Nov. 14, 2006, two pages.
Notice of Allowance mailed Mar. 23, 2010, for U.S. Appl. No. 11/428,501, filed Jul. 3, 2006, eight pages.
Notice of Allowance mailed Apr. 26, 2010, for U.S. Appl. No. 11/559,822, filed Nov. 14, 2006, nine pages.
Notice of Allowance mailed Jun. 21, 2010, for U.S. Appl. No. 11/677,958, filed Feb. 22, 2007, eight pages.
Notice of Allowance mailed Aug. 16, 2011, for U.S. Appl. No. 11/559,763, filed Nov. 14, 2006, nine pages.
Notice of Allowance mailed Oct. 26, 2011, for U.S. Appl. No. 11/559,763, filed Nov. 14, 2006, nine pages.
Notice of Allowance mailed Mar. 9, 2012, for U.S. Appl. No. 11/240,788, filed Sep. 30, 2005, five pages.
Notice of Allowance mailed Mar. 26, 2012, for U.S. Appl. No. 12/500,973, filed Jul. 10, 2009, 12 pages.
Notice of Allowance mailed Apr. 2, 2012, for U.S. Appl. No. 11/038,590, filed Jan. 18, 2005, 11 pages.
Notice of Allowance mailed Apr. 13, 2012, for U.S. Appl. No. 12/342,027, filed Dec. 22, 2008, 10 pages.
Notice of Allowance mailed Jun. 27, 2012, for U.S. Appl. No. 11/559,736, filed Nov. 14, 2006, 11 pages.
Notice of Allowance mailed Jul. 26, 2012, for U.S. Appl. No. 11/428,503, filed Jul. 3, 2006, nine pages.
Notice of Allowance mailed Aug. 22. 2012, for U.S. Appl. No. 11/559,763, filed Nov. 14, 2006, 10 pages.
Notice of Allowance mailed Sep. 6, 2012, for U.S. Appl. No. 13/556,019, filed Jul. 23, 2012, seven pages.
Notification of Reason(s) for Refusal mailed Apr. 25, 2011, for JP Patent Application No. 2008-531106, with English Translation, five pages.
Pavlovic, V.I. et al. (Jul. 1997). "Visual interpretation of Hand Gestures for Human-Computer Interaction: A Review," *IEEE Transactions on Pattern Analysis and Machines Intelligence* 19(7):677:695.
Rubine, D.H. (Dec. 1991). "The Automatic Recognition of Gestures," CMU-CS-91-202. Submitted in Partial Fullfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Smith, R. et al. (1996). "Relating Distortion to Performance in Distortion-Oriented Displays," *Proceedings of the 6$^{th}$ Australian Conference on Computer-Human Interaction* (OZCHI '96), pp. 64-11.
Sun Microsystems. (1992). "The Star7 PDA Prototype, located at <http://www.youtube.com/watch?v=Ahg8OBYixL0>," last visited Jan. 15, 2010, seven pages.
The Gadgeteer. (Jun. 6. 2003) "Apple iPod (30GB)," available at http://the-gadgeteer.com/review/apple_ipod_30gb_review, last visited Apr. 28, 2008, 19 pages.
U.S. Appl. No. 11/272,868, filed Nov. 15, 2005, by Pryor.
U.S. Appl. No. 11/349,350, filed Feb. 8, 2006, by Pryor.
U.S. Appl. No. 11/878,024, filed Jul. 20, 2007, by Pryor.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Westerman, Wayne, et al. (2001). "Multi-Touch: A New Tactile 2-D Gesture Interface for Human-Computer Interaction," *Proceedings of the Human Factors and Ergonomics Society 45th Annual Meeting*.
Gorman, M., "Hands-on with Immersion HD Integrator hi-fi-haptics," Engadget.com, Feb. 23, 2012, http://www.engadget.com/2012/02/23/hands-on-with-immersion-hd-integrator-hi-fi-haptics/?utm_medium=referral&utm_source=pulsenews, 4 pages.
Lécuyer et al., "Feeling Bumps and Holes without a Haptic Interface: the Perception of Pseudo-Haptic Textures," CHI 2004, Apr. 24-29, 2004 Vienna, Austria, 6 pages.
Poupyrev et al., "Tactile Interfaces for Small Touch Screens," Proceedings of the 16th annual ACM symposium on User interface software and technology. ACM 2003, 4 pages.
Tactilicio.us "Bringing surface relief to mobile touchscreens," downloaded Mar. 28, 2009, tactilico.us/category/mobile-haptics/ 5 pages.
Tidwell, J., "Builders and Editors," from Designing Interfaces, Copyright © 2006 O'Reilly Media, Inc., 18 pages.
Tidwell, J., "Magnetism," from Designing Interfaces, Copyright © 2006 O'Reilly Media, Inc., pp. 279-280.
Office Action dated May 22, 2012, received in European Patent Application No. 06 801 347.3, which corresponds to U.S. Appl. No. 11/228,700, 5 pages (Ording).
Office Action dated Aug. 9, 2013, reveived in Japanese Patent Application No. 2012 106292, which corresponds to U.S. Appl. No. 11/228,700, 4 pages (Ording).
Office Action dated Jul. 12, 2013, received in U.S. Appl. No. 12/790,479, 23 pages, Ording).
Final Office Action dated Dec. 4, 2013, received in U.S. Appl. No. 12/790,479, 24 pages (Ording).

\* cited by examiner

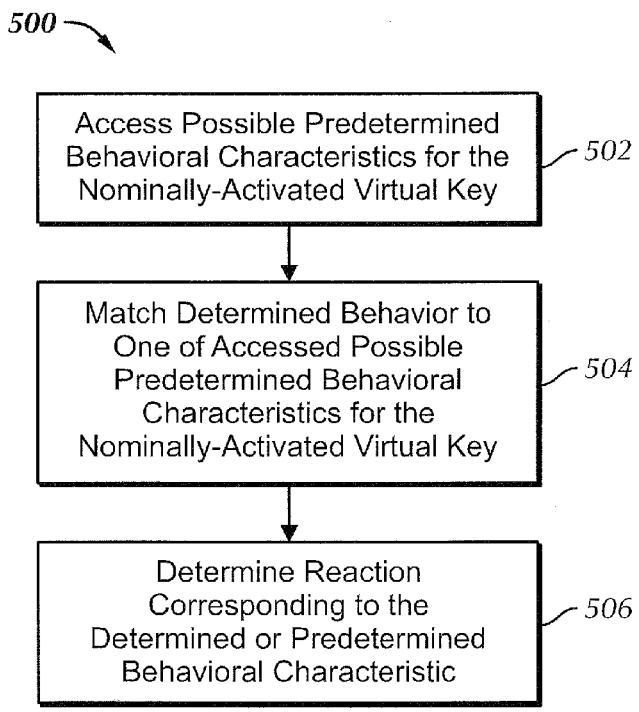

| Virtual Key | Predetermined Behavioral Characteristics | Reaction |
|---|---|---|
| 408 | 414 | 416 |
| 410 | | |
| ⋮ | ⋮ | ⋮ |
| 412 | | |

- Access Possible Predetermined Behavioral Characteristics for the Nominally-Activated Virtual Key — 502
- Match Determined Behavior to One of Accessed Possible Predetermined Behavioral Characteristics for the Nominally-Activated Virtual Key — 504
- Determine Reaction Corresponding to the Determined or Predetermined Behavioral Characteristic — 506

*FIG. 5*

| | | |
|---|---|---|
| | 651<br>Duration < Z | 681<br>No Activation |
| | 652<br>Duration < X and > Z | 682<br>Single Activation |
| | 654<br>Duration ≥ X<br>and Duration < Y | 684<br>Repeated Activation<br>as Function<br>of Duration |
| | 656<br>Duration ≥ Y | 686<br>No Activation |

OPERATION OF A COMPUTER WITH TOUCH SCREEN INTERFACE

CROSS-REFERENCE TO RELATED APPLICATIONS

This application is a continuation of application Ser. No. 11/228,700 filed Sep. 16, 2005 from which priority under 35 U.S.C. §120 is claimed, which is hereby incorporated by reference in its entirety, which application is a continuation-in-part of prior application Ser. No. 10/903,964, from which priority under 35 U.S.C. §120 is claimed, which is hereby incorporated by reference in its entirety. This application is also related to the following applications: U.S. Ser. No. 10/840,862, filed May 6, 2004; U.S. Ser. No. 11/048,264, filed Jul. 30, 2004; U.S. Ser. No. 11/038,590, filed Jul. 30, 2004; (U.S. Ser. No. 11/228,737), entitled "ACTIVATING VIRTUAL KEYS OF A TOUCH-SCREEN VIRTUAL KEYBOARD", filed concurrently herewith; and (U.S. Ser. No. 11/228,758), entitled "VIRTUAL INPUT DEVICE PLACEMENT ON A TOUCH SCREEN USER INTERFACE", filed concurrently herewith; all of which are hereby incorporated herein by reference in their entirety for all purposes.

BACKGROUND

1. Technical Field

The present patent application relates to touch screen user interfaces and, in particular, relates to operation of a computer based on interaction by a user with a virtual GUI item, such as a virtual keyboard on a touch screen user interface.

2. Description of the Related Art

A touch screen is a type of display screen that has a touch-sensitive transparent panel covering the screen, or can otherwise recognize touch input on the screen. Typically, the touch screen display is housed within the same housing as computer circuitry including processing circuitry operating under program control. When using a touch screen to provide input to an application executing on a computer, a user makes a selection on the display screen by pointing directly to graphical user interface (GUI) objects displayed on the screen (usually with a stylus or a finger).

A collection of GUI objects displayed on a touch screen may be considered a virtual keyboard. Similar to a conventional external keyboard that is not so closely associated with a display screen, the virtual keyboard includes a plurality of keys ("virtual keys"). Activation of a particular virtual key (or combination of virtual keys) generates a signal (or signals) that is provided as input to an application executing on the computer.

Touch screen keyboards, by nature of the hardware on which they operate, typically glean much more information about a user's actions than can be gleaned with a typical external keyboards. For example, whereas a typical external keyboard includes a single "sensor" (such as a mechanical switch or electrical connection) or a small number of sensors per key, touch screen keyboards typically have many more sensors per virtual key.

It is desirable to use the information about a user's actions to make the user experience with the computer, via the touch screen virtual keyboard, more powerful than is usual (or, perhaps, even possible) with computers using external keyboards.

On the other hand, even touch screens, with their numerous sensors, typically lack the ability to directly glean some types of information about a user's actions. It is desirable to use the information available to infer other types of information, for example, information which cannot be directly gleaned about the user's actions.

SUMMARY

A touch screen computer executes an application. A method of operating the touch screen computer in response to a user is provided. A virtual input device is provided on the touch screen. The virtual input device comprises a plurality of virtual GUI items (which may be, in some specific examples, virtual keys of a virtual keyboard). It is detected that a user has touched the touch screen to nominally activate at least one virtual GUI item (e.g., virtual key), and a behavior of the user with respect to touch is determined. The determined behavior is processed and a predetermined characteristic is associated with the nominally-activated at least one virtual GUI item. A reaction to the nominal activation is determined based at least in part on a result of processing the determined behavior.

BRIEF DESCRIPTION OF FIGURES

FIG. 4 illustrates a table data structure useable to determine reactions based on matching predetermined behavioral characteristics to actual behavioral characteristics with respect to nominally-activating particular virtual keys.

FIG. 5 is a flowchart illustrating an example of processing to determine a reaction with respect to particular user behavior.

DETAILED DESCRIPTION

Examples and aspects are discussed below with reference to the figures. However, it should be understood that the detailed description given herein with respect to these figures is for explanatory purposes only, and not by way of limitation.

Figure 1:
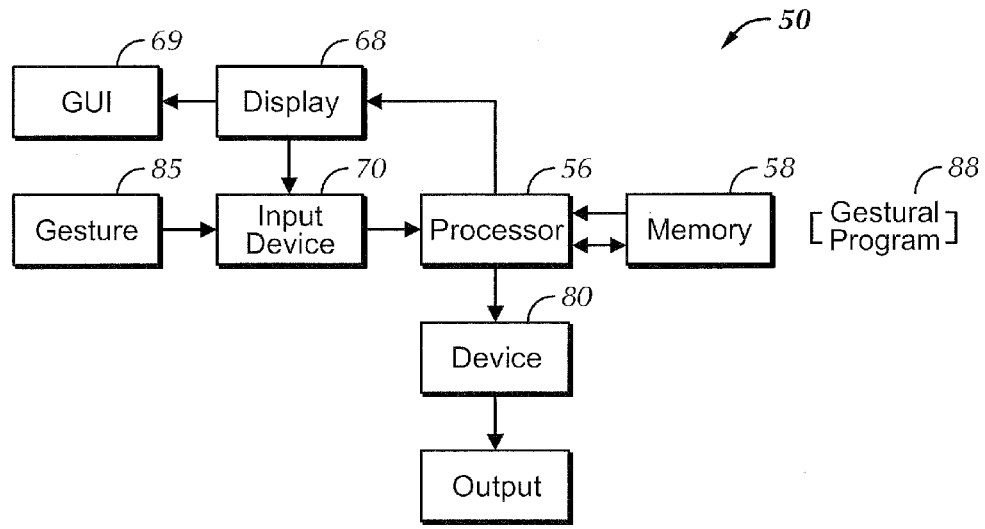
FIG. 1 is a block diagram of an exemplary touch-screen based computer system, in accordance with one embodiment of the present invention

FIG. 1 is a block diagram of an exemplary computer system 50, in accordance with one embodiment of the present invention. The computer system 50 may correspond to a personal computer system, such as a desktop computer system, a laptop computer system, a tablet computer system or a handheld computer system. The computer system may also correspond to a computing device, such as a cell phone, PDA, dedicated media player, consumer electronic device, and the like.

The exemplary computer system 50 shown in FIG. 1 includes a processor 56 configured to execute instructions and to carry out operations associated with the computer system 50. For example, using instructions retrieved for example from memory, the processor 56 may control the reception and manipulation of input and output data between components of the computing system 50. The processor 56 can be implemented on a single-chip, multiple chips or multiple electrical components. For example, various architectures can be used for the processor 56, including dedicated or embedded processor, single purpose processor, controller, ASIC, and so forth.

In most cases, the processor 56 together with an operating system operates to execute computer code and produce and use data. Operating systems are generally well known and will not be described in greater detail. By way of example, the operating system may correspond to OS/2, DOS, Unix, Linux, Palm OS, and the like. The operating system can also be a special purpose operating system, such as may be used for limited purpose appliance-type computing devices. The operating system, other computer code and data may reside within a memory block 58 that is operatively coupled to the processor 56. Memory block 58 generally provides a place to store computer code and data that are used by the computer system 50. By way of example, the memory block 58 may include Read-Only Memory (ROM), Random-Access Memory (RAM), hard disk drive and/or the like. The information could also reside on a removable storage medium and loaded or installed onto the computer system 50 when needed. Removable storage mediums include, for example, CD-ROM, PC-CARD, memory card, floppy disk, magnetic tape, and a network component.

The computer system 50 also includes a display device 68 that is operatively coupled to the processor 56. The display device 68 may be a liquid crystal display (LCD) (e.g., active matrix, passive matrix and the like). Alternatively, the display device 68 may be a monitor such as a monochrome display, color graphics adapter (CGA) display, enhanced graphics adapter (EGA) display, variable-graphics-array (VGA) display, super VGA display, cathode ray tube (CRT), and the like. The display device may also correspond to a plasma display or a display implemented with electronic inks.

The display device 68 is generally configured to display a graphical user interface (GUI) 69 that provides an easy to use interface between a user of the computer system and the operating system or application running thereon. Generally speaking, the GUI 69 represents, programs, files and operational options with graphical images. The graphical images may include windows, fields, dialog boxes, menus, icons, buttons, cursors, scroll bars, etc. Such images may be arranged in predefined layouts, or may be created dynamically to serve the specific actions being taken by a user. During operation, the user can select and activate various graphical images in order to initiate functions and tasks associated therewith. By way of example, a user may select a button that opens, closes, minimizes, or maximizes a window, or an icon that launches a particular program. The GUI 69 can additionally or alternatively display information, such as non interactive text and graphics, for the user on the display device 68.

The computer system 50 also includes an input device 70 that is operatively coupled to the processor 56. The input device 70 is configured to transfer data from the outside world into the computer system 50. The input device 70 may for example be used to perform tracking and to make selections with respect to the GUI 69 on the display 68. The input device 70 may also be used to issue commands in the computer system 50. The input device 70 may include a touch sensing device configured to receive input from a user's touch and to send this information to the processor 56. By way of example, the touch-sensing device may correspond to a touchpad or a touch screen. In many cases, the touch-sensing device recognizes touches, as well as the position and magnitude of touches on a touch sensitive surface. The touch sensing means reports the touches to the processor 56 and the processor 56 interprets the touches in accordance with its programming. For example, the processor 56 may initiate a task in accordance with a particular touch. A dedicated processor can be used to process touches locally and reduce demand for the main processor of the computer system. The touch sensing device may be based on sensing technologies including but not limited to capacitive sensing, resistive sensing, surface acoustic wave sensing, pressure sensing, optical sensing, and/or the like. Furthermore, the touch sensing means may be based on single point sensing or multipoint sensing. Single point sensing is capable of only distinguishing a single touch, while multipoint sensing is capable of distinguishing multiple touches that occur at the same time.

The input device 70 may be a touch screen that is positioned over or in front of the display 68. The touch screen 70 may be integrated with the display device 68 or it may be a separate component. The touch screen 70 has several advantages over other input technologies such as touchpads, mice, etc. For one, the touch screen 70 is positioned in front of the display 68 and therefore the user can manipulate the GUI 69 directly. For example, the user can simply place their finger over an object to be controlled. In touch pads, there is no one-to-one relationship such as this. With touchpads, the touchpad is placed away from the display typically in a different plane. For example, the display is typically located in a vertical plane and the touchpad is typically located in a horizontal plane. This makes its use less intuitive, and therefore more difficult when compared to touch screens. In addition to being a touch screen, the input device 70 can be a multipoint input device. Multipoint input devices have advantages over conventional singlepoint devices in that they can distinguish more than one object (finger). Singlepoint devices are simply incapable of distinguishing multiple objects. By way of example, a multipoint touch screen, which can be used herein, is shown and described in greater detail in copending and commonly assigned U.S. patent application Ser. No. 10/840,862, which is hereby incorporated herein by reference.

The computer system 50 also includes capabilities for coupling to one or more I/O devices 80. By way of example, the I/O devices 80 may correspond to keyboards, printers, scanners, cameras, speakers, and/or the like. The I/O devices 80 may be integrated with the computer system 50 or they may be separate components (e.g., peripheral devices). In some cases, the I/O devices 80 may be connected to the computer system 50 through wired connections (e.g., cables/ports). In other cases, the I/O devices 80 may be connected to the computer system 80 through wireless connections. By way of example, the data link may correspond to PS/2, USB, IR, RF, Bluetooth or the like.

Particular processing within a touch-screen based computer is now described, where the processing accomplishes execution of an application as well as providing a display on the touch screen of the computer. The display processing includes providing a composite display that has characteristics based on the application display as well as characteristics relative to a virtual input device. The virtual input device display includes at least an input portion, to receive appropriate touch input to the touch screen relative to the displayed input device, for a user to interact with the virtual input device. The user interaction with the virtual input device includes activating portions of the virtual input device to provide user input to affect the application processing. The virtual input device (i.e., processing on the computer to accomplish the virtual input device) processes the user interaction and, based on the processing, provides the corresponding user input to the application.

The virtual input device display is typically highly correlated to the virtual input device processing of user interaction with the virtual input device. For example, if the virtual input device is a virtual keyboard, the virtual input device display may include a graphic representation of the keys of a typical QWERTY keyboard, whereas virtual input device processing of user interaction with the virtual keyboard includes determining which virtual keys have been activated by the user and providing corresponding input (e.g., letters and/or numbers) to the application.

Figure 2:
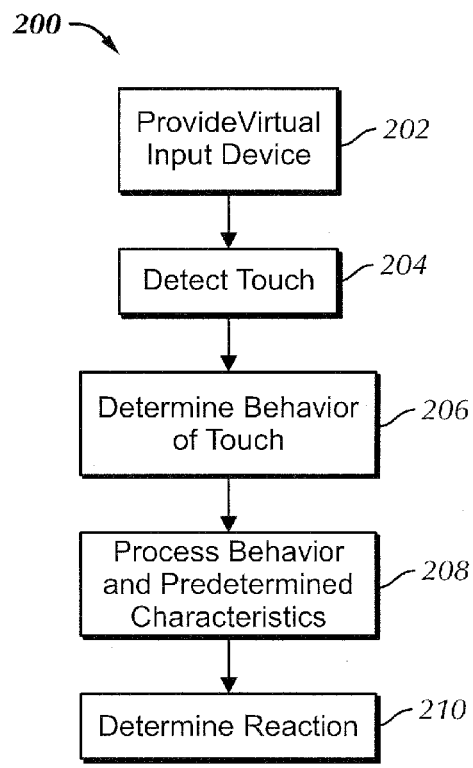
FIG. 2 is a flow chart broadly illustrating a method by which behavior of a user's touch, with respect to a virtual input device displayed on a touch screen of a multipoint sensing device, is processed to affect a reaction to the user's touch.

We now turn to FIG. 2, which is a flow chart illustrating a broad aspect of the invention. In particular, the FIG. 2 flow chart broadly illustrates a method by which behavior of a user's touch, with respect to a virtual input device displayed on a touch screen of a multipoint sensing device, is processed to affect a reaction to the user's touch. At step 202, the virtual input device is provided on the touch screen. The virtual input device may be, for example, a virtual QWERTY-style keyboard or other input device having virtual keys.

At step 204, a user's touch on the multipoint sensing device, to nominally activate a virtual key, is detected. Detecting a user's touch may be conventional. At step 206, the "behavior" of the user's touch is determined. The behavior is typically determined by processing signals created by the multipoint sensing device in response to the user's touch. Behaviors may be, for example, in the spatial domain (i.e., where on the multipoint sensing device the user touched to nominally activate the virtual key) or in the time domain (i.e., with what timing the user touched the multipoint sensing device to nominally activate the virtual key) and a combination of both spatial and time domain.

At step 208, the determined behavior and predetermined characteristics associated with the nominally-activated virtual key are processed. At step 210, based on the processing in step 208, a reaction is determined to activation of the nominally-activated virtual key. Examples of predetermined characteristics are illustrated later in this description. Broadly speaking, however, the predetermined characteristics for a virtual key are characteristics associated with particular behaviors or ranges of behaviors of a user's touch to nominally activate that virtual key.

Figure 3:
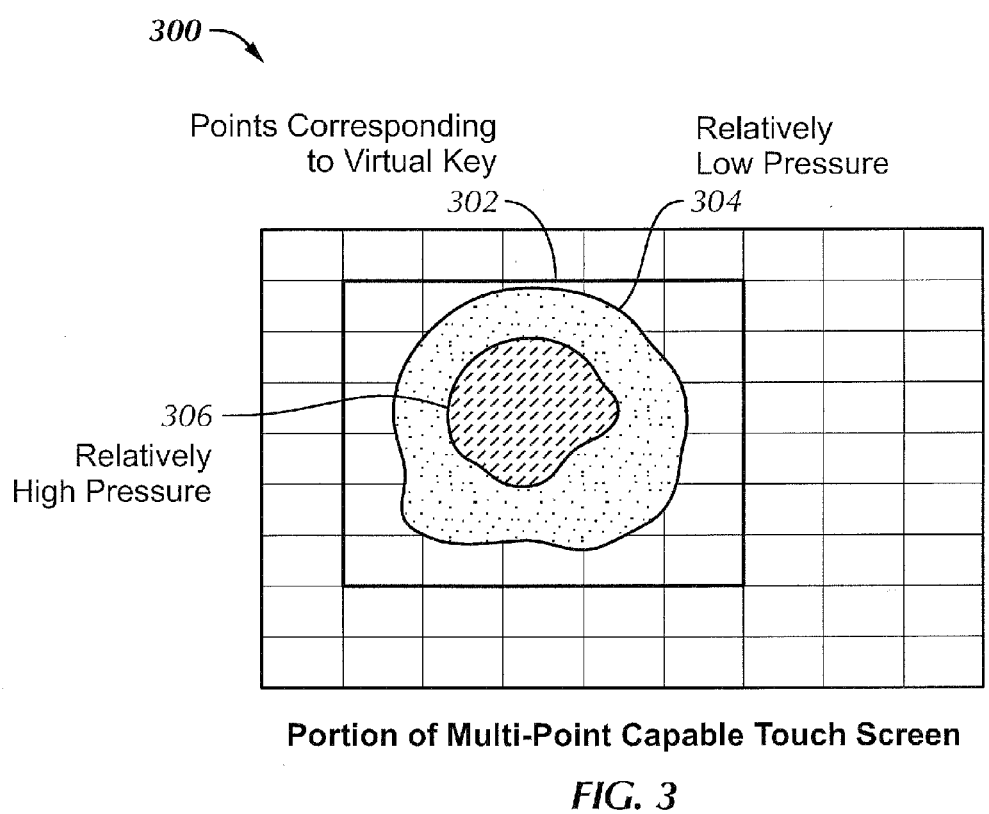
FIG. 3 illustrates using processing signals created by the multipoint sensing device in response to the user's touch in order to infer the pressure with which the user's touched the touch screen to activate a nominally-activated virtual key.

FIG. 3 illustrates using processing signals created by the multipoint sensing device in response to the user's touch in order to infer the pressure with which the user's touched the touch screen to activate a nominally-activated virtual key. Such processing is useful in the case where a pressure signal is not directly available from the touch screen, or to supplement a pressure signal that is directly available from the touch screen. The area 302 represents points on the touch screen that correspond to a particular virtual key. While the area 302 is a square, virtual keys need not be limited to being a particular shape.

Area 306 indicates (in a spatial domain) points on a touch screen that a user touched to nominally activate the virtual key of area 302. Similarly, area 304 indicates points on the touch screen that a user touched to nominally activate the virtual key of area 302. Which points are touched may be determined, for example, from the processing signals created by the multipoint sensing device in response to the user's touch.

Since area 304 encompasses more points than area 306, the touch corresponding to area 304 was with greater pressure than the touch corresponding to area 306. Furthermore, an indication of the actual pressure with which a virtual key is nominally activated may be inferred from the area corresponding to the user's touch.

While FIG. 3 illustrates all of the points within areas 304 and 306 fall within the area 302, this need not necessarily be the case. Furthermore, while FIG. 3 illustrates using the user's behavior in the spatial domain to infer pressure with which a virtual key is nominally activated, in some examples, the user's behavior in the time domain may be used to infer pressure with which a virtual key is nominally activated. In other examples, a combination of the user's behavior in the spatial domain and the time domain may be used to infer pressure with which a virtual key is nominally activated.

Having described one particular example of behavior of a user's touch of a touch screen to nominally activate a virtual key, we now describe one example of processing to process the determined behavior with which the user nominally activates a virtual key and predetermined characteristics for the nominally-activated virtual key.

Referring to FIG. 4, this figure illustrates a table in which each row is for a different one of a plurality of virtual keys. For example, row 408 is for one virtual key; row 410 is for another virtual key; and row 412 is for yet another virtual key. Column 402 includes indications of the virtual keys. Column 404 includes indications of predetermined behavioral characteristics for the virtual keys.

The predetermined behavioral characteristics are discussed in detail later. Broadly speaking, the predetermined behavioral characteristics are predetermined values of user's behavior (for example, specific values or ranges of values) in the spatial domain, the time domain or both. Using the FIG. 3 example, predetermined behavioral characteristics indicated in column 404 may include, for example, specific values of inferred pressure of a user's touch of a touch screen to nominally activate a virtual key indicated in column 402. As another example, the predetermined characteristics indicated in column 404 may include ranges of values of inferred pressure of a user's touch of the touch screen to nominally activate a virtual key indicated in column 402.

The column 406 includes indications of reactions corresponding to the predetermined characteristics indicated in column 404. That is, each reaction indicated in column 406 is an action to be taken (or, in some cases, not taken) when a determined behavior is matched to a particular predetermined behavioral characteristic in column 404.

An example of processing to determine a reaction with respect to particular user behavior is now described with reference to the flowchart in FIG. 5. For ease of illustration, the operation of the FIG. 5 example is discussed with respect to the FIG. 4 table, and with respect to a particular nominally-activated key, although the method illustrated in the FIG. 5 flowchart is not limited to being used with respect to a data structure of the form shown in FIG. 4.

Turning now to FIG. 5, at step 502, the possible predetermined behavioral characteristics in column 404 for the particular nominally-activated virtual key (in column 402) are accessed. For example, the particular nominally-activated key may be indicated in the entry where row 410 intersects with column 402. The accessed possible predetermined behavioral characteristics would then be within the rectangle 414.

At step 504, the determined behavior (i.e., the behavior of the user's touch in the spatial and/or time domain) is matched to the possible predetermined behavioral characteristics indicated in column 404. Then, in step 506, based on the matching, a reaction from column 406 is determined. Using the example of row 410, the determined reaction would be one of the reactions indicated within the rectangle 416.

Figures 6A, 6B:
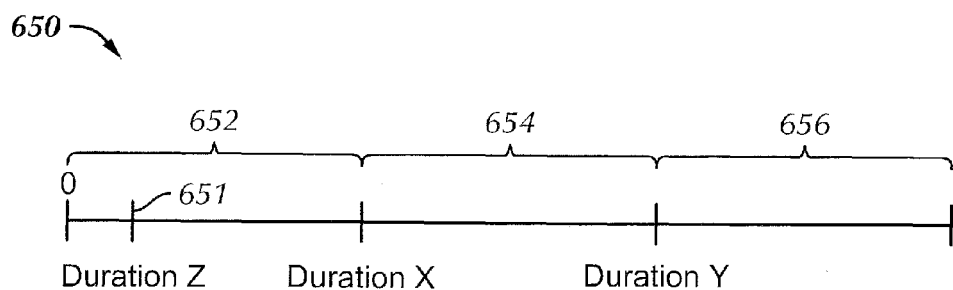
FIG. 6A illustrates a timeline corresponding to "durations" of user behavior in the temporal domain.
FIG. 6B illustrates a table data structure similar to the table illustrated in FIG. 4, to determine reactions based on user behaviors with respect to "durations" such as are illustrated in FIG. 6A.

We now discuss in greater detail, with reference to FIGS. 6A and 6B, what may be the predetermined behavioral characteristics indicated, for example, in column 404 of the FIG. 4 table and corresponding determined reactions. In the example of FIGS. 6A and 6B, the predetermined behavioral characteristics are in the time domain only and, specifically, are durations (here, ranges of durations) of the user's touch of the touch screen to nominally activate a virtual key.

FIG. 6A illustrates a timeline 650, with increasing duration from left to right. Various durations are indicated on the timeline, including "z", "x" and "y," from left to right. Reference numeral 651 indicates a duration less than "z." Reference numeral 652 indicates a duration greater than or equal to "z" and less than "x." Reference numeral 654 indicates a duration greater than or equal to "x" and less than "y." Finally, reference numeral 656 indicates a duration greater than or equal to "y."

FIG. 6B illustrates a portion of a table similar to the table illustrated in FIG. 4. The column 602 includes the entry for one particular nominally-activated virtual key. The column 604 includes entries for the predetermined behavioral characteristics. In the FIG. 6B example, the column 604 includes entries for the durations 651, 652, 654 and 656 denoted on the FIG. 6A timeline 650.

As discussed with reference to FIG. 5, the predetermined behavioral characteristics are matched to the determined behavior of the user's touch that nominally activates the virtual key. Based on the match, a reaction is determined. Column 606 of the FIG. 6B table portion includes indications of such reactions.

The reaction indications in column 606 are indicated by reference numerals 681, 682, 684 and 686; corresponding to the predetermined behavioral characteristics indicated by reference numerals 651, 652, 654 and 656. Referring to the specific reaction indications in column 606, the reaction indication 681 indicates that the nominally-activated virtual key is to not, in fact, be activated. That is, the duration of the touching is too short to indicate an actual activation of the virtual key. Similarly, the reaction indication 686 indicates that the nominally-activated virtual key is to not be actually activated. In this case, the duration of the touching is too long, presumably corresponding to a resting finger or hand part and not to an intentional activation.

The remaining reaction indications are the reaction indication 682 and the reaction indication 684. The reaction indication 682 indicates that the nominally-activated key is to be actually activated a single time. The reaction indication 684 indicates that the nominally-activated key is to be actually activated repeated times, with the number of times to repeat the actual activation a function of the duration of the touching.

FIG. 6A and FIG. 6B illustrate a simple example of determining reactions based on a determined behavior of the user in the time domain. As discussed above, reactions may be determined based on determined behaviors in the spatial domain, and based on a combination of determined behaviors in the spatial domain and in the time domain. The number and range of determined behaviors that may be used to determine reactions is limited, to some extent, only by what behavioral characteristics can be discerned or inferred.

A determined behavior in the spatial domain—inferred pressure—was discussed above with reference to FIG. 3. Other possible behaviors in the spatial domain include, for example, the area of the touch of a nominally-activated virtual key relative to the area of the touch of an adjacent such virtual key (i.e., there is not a "direct hit" of the user's finger in touching a virtual key). Possible behaviors that are in a combination of the spatial domain and the time domain are referred to, in some instances, as "gestures." See, for example, U.S. patent application Ser. No. 10/903,964, entitled GESTURES FOR TOUCH SENSITIVE INPUT DEVICES and filed Jul. 30, 2004.

Furthermore, the possible reactions, too, are somewhat limitless. Particularly where possible reactions are common possible reactions (such as, for example, a single activation or repeated activations), the reaction indication entry may be a link to a repository of such common possible reactions.

In some examples, the possible reactions and/or the predetermined behavioral characteristics may be user configurable, for example, using a menu or other utility. In some examples the possible reactions and/or the predetermined behavioral characteristics are automatically and dynamically configurable, based on the ongoing determined behavior of the user.

Figure 9:
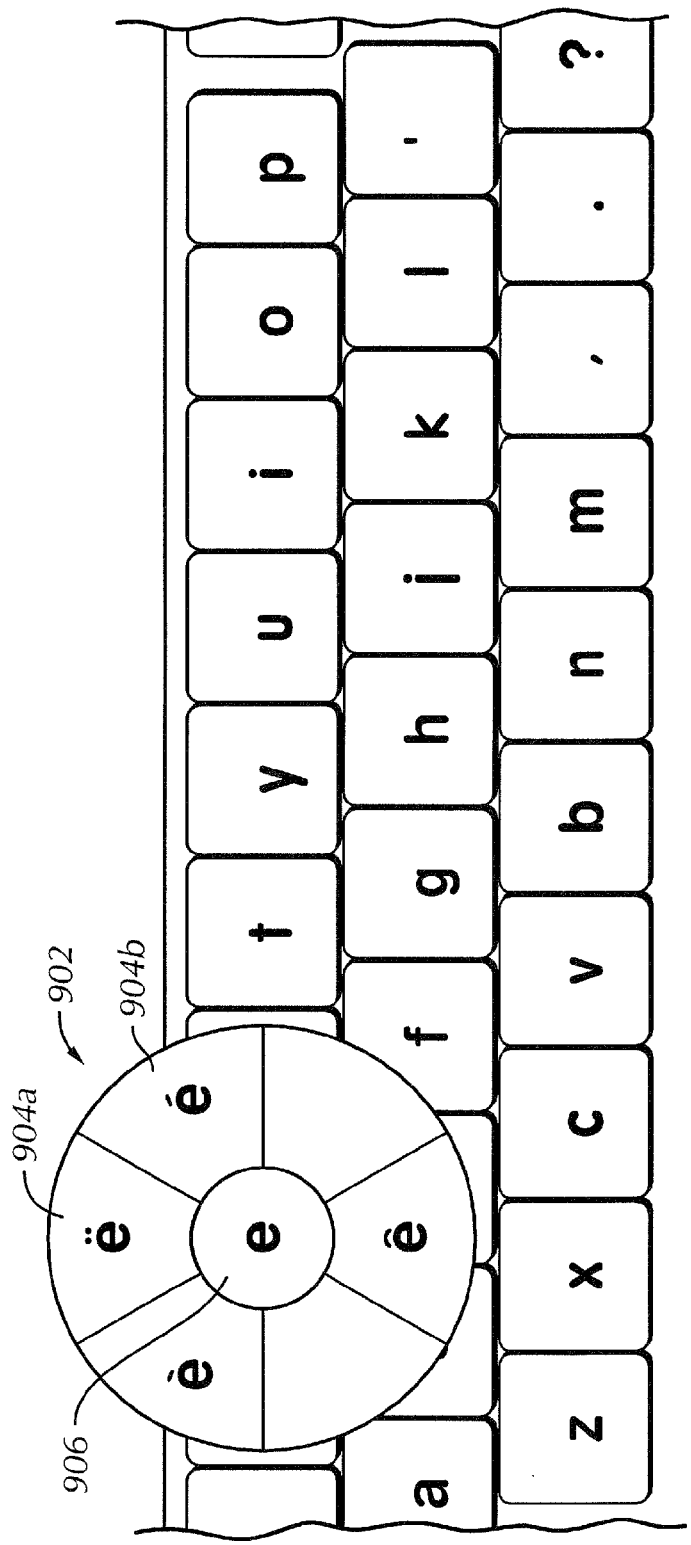
FIG. 9 illustrates a possible reaction to a nominal virtual key activation is display of a menu.

FIG. 9 illustrates a possible reaction is display of a menu 902. For example, the user may activate the "e" virtual key 906 with a particular behavior, and the reaction includes display of the menu 902. The menu 902, in the FIG. 9 illustration, includes additional virtual keys (e.g., 904a and 904b) corresponding to different forms of "e." In some examples, actual display of the menu 902 is bypassed based on particular behaviors, although the virtual keys of the menu 902 are still present and able to be activated. For example, the user may nominally activate the "e" virtual key 906 with a "brush" gesture toward the additional virtual key 904 that is desired to be activated. The user would know the location of the additional virtual keys 904 based, for example, on previous use operation of the virtual keyboard. Not displaying the menu 902, a shortcut is provided for activating the additional virtual keys 904.

Figures 7, 8:
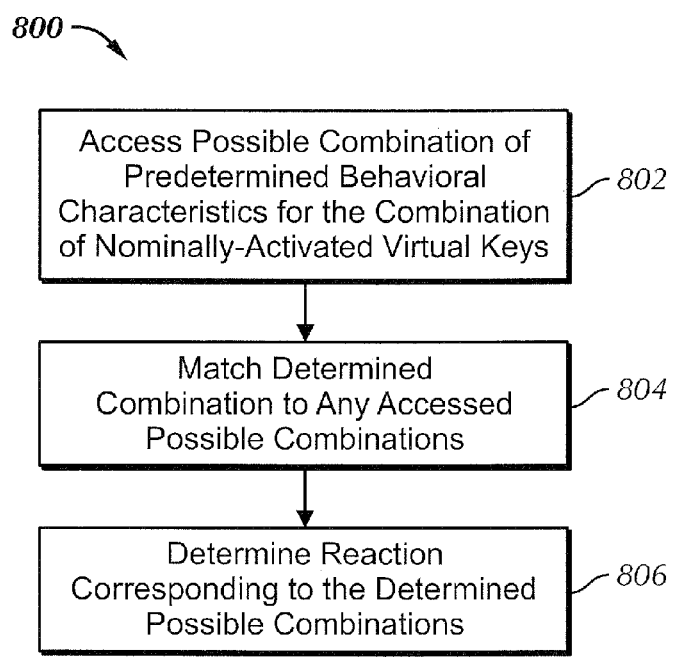
FIG. 7 illustrates a table structure for determining reactions based on user behavior with respect to nominally activating combinations of virtual keys.
FIG. 8 is a flow chart illustrating an example of processing to determine a reaction with respect to particular user behavior with respect to nominally activating combinations of virtual keys.

We now discuss, with reference to FIG. 7 and FIG. 8, an example where a combination of virtual keys is nominally activated. This example is similar in many ways to the example discussed above with reference to FIG. 5 and FIGS. 6A and 6B. Referring first to FIG. 7, the column 702 includes entries for combinations of nominally-activated virtual keys. For example, one such entry in column 702 may be for a virtual key corresponding to an "a" in combination with a virtual key corresponding to a "SHIFT."

Each single possible combination of nominally-activated keys need not have a separate entry in the column 702. Where the combinations of predetermined behavioral characteristics in column 704 and the possible reactions in column 706 have common characteristics for plural combinations of nominally-activated virtual keys, the entries in column 704 and/or column 706 may be common to the plural combinations of predetermined behavioral characteristics, and parameterized if necessary to accommodate unique attributes associated with particular ones of the combinations of nominally-activated virtual keys.

Typically, many combinations of virtual keys do not have corresponding entries, such combinations typically resulting from inadvertent touching of the combinations of virtual keys. For a combination that does not have a corresponding entry, there would be no reaction to the combination. As another example, the such combinations may have corresponding entries, and the reaction would be "no reaction" or a reaction to generate an alert (e.g., a "beep" or other alert) to the user.

Referring to FIG. 8, the flowchart 800 illustrates an example of processing to determine a reaction with respect to particular user behavior relative to a combination of nominally-activated virtual keys. While not so limited, the operation of the FIG. 8 processing is described with reference to the data structure illustrated in FIG. 7.

At step 802, the possible predetermined behavioral characteristics in column 704 for the particular combination of nominally-activated virtual keys (in column 702) are accessed. At step 804, the determined behavior (i.e., the behavior of the user's touch in the spatial and/or time domain) is matched to the possible predetermined behavioral characteristics indicated in column 704. Then, in step 806, based on the matching, a reaction from column 706 is determined.

Figure 10:
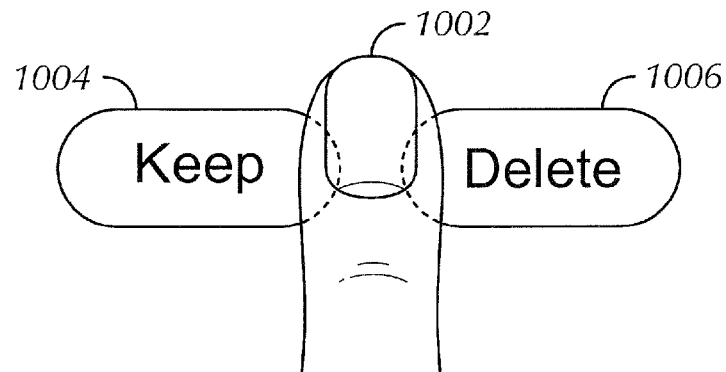
FIG. 10 illustrates an example of a display having GUI items that are not virtual keys.

FIG. 10 illustrates an example of a display having virtual GUI items that are not virtual keys of a virtual keyboard. The general concepts discussed above with the specific example of virtual keys of a virtual keyboard are generally applicable to virtual GUI items. For example, less pressure and/or shorter duration of touching (e.g., by a finger 1002) may be required to activate the "keep" virtual GUI item 1004 than to activate the "delete" virtual GUI item 1006. In addition, the processing may be such that activation of some GUI items (such as the "delete" GUI item, for example) require additional behavior, such as a "wiggle" or other gesture, which would serve as additional confirmation that it is intended for the GUI item to be activated.

In some examples, the combination is "registered" only upon a particular condition, such as one virtual key of the combination being released.

Figure 11:
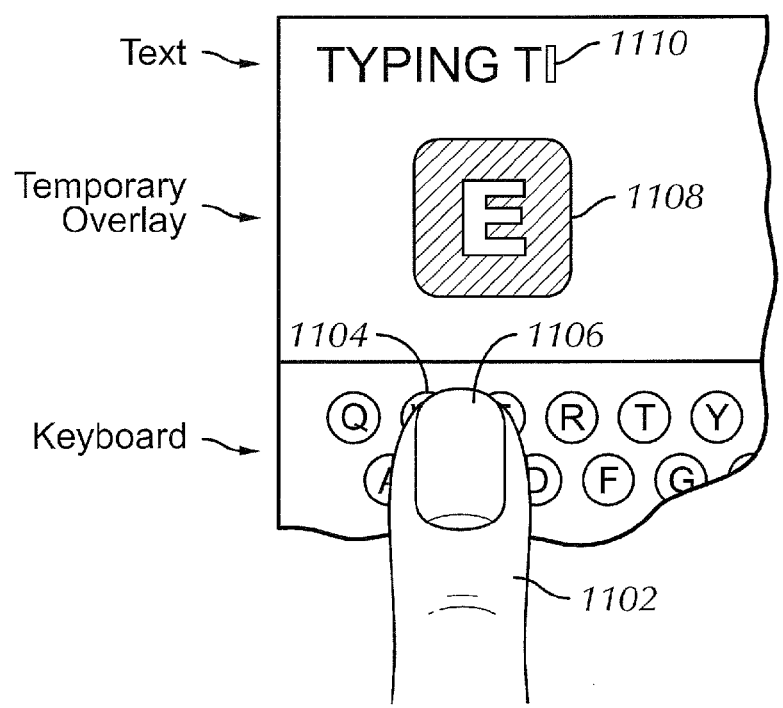
FIG. 11 illustrates a GUI including a virtual keyboard and feedback of a letter being activated.

In some examples, a "preview" function is provided. Thus, for example, before a virtual GUI item's activation is committed, an indication of the activation is displayed. This may be particularly useful, for example, where the virtual GUI items are particularly small. FIG. 11 illustrates a finger 1102 whose touch may be activating either the "w" virtual key or the "e" virtual key. The temporary overlay 1108 displays an indication that the "e" virtual key is to be activated, before the "e" virtual key activation is committed as typed text 1110. For example, the finger 1102 being lifted while a particular virtual key is indicated as being to be activated may cause the particular virtual key to actually be activated. In the FIG. 11 example, if the "e" virtual key is not to be activated, then the finger 1102 may be moved (e.g., without lifting it) on the touch screen to activate a different virtual key.

The various aspects, features, embodiments or implementations of the invention described above can be used alone or in various combinations. The invention is preferably implemented by software, but can also be implemented in hardware or a combination of hardware and software. The invention can also be embodied as computer readable code on a computer readable medium. The computer readable medium is any data storage device that can store data that can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may, but need not, yield one or more of the disclosed advantages. As set forth above, one advantage of the invention is that how a touch screen computer reacts to a user's touch to a virtual keyboard provided on the touch screen can be based on a deep appreciation for the behavior with which the user touches the touch screen. Another advantage of the invention is that how the touch screen computer reacts to the user's touch can be highly configurable.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed:

1. A method, comprising:
at an electronic device with a touch-sensitive surface and a display, wherein the device includes one or more sensors to detect pressure of contacts with the touch-sensitive surface:
concurrently displaying, on the display, a plurality of controls of a same control type, including a first control associated with a first control-activation pressure threshold and a second control associated with a second control-activation pressure threshold that is higher than the first control-activation pressure threshold;
detecting a multipoint input that includes concurrently detecting a plurality of contacts, that includes a respective contact, on the touch-sensitive surface;
while the respective contact is at a location on the touch-sensitive surface that corresponds to a respective control of the first control or the second control:
detecting a gesture corresponding to the respective contact; and
in response to detecting the gesture:
in accordance with a determination that the respective contact has a pressure during the gesture that is above the respective pressure threshold associated with the respective control, performing a respective operation associated with the respective control in accordance with the interaction; and
in accordance with a determination that the respective contact does not have a pressure during the gesture that is above the respective pressure threshold, forgoing performing the respective operation associated with the respective control.

2. The method of claim 1, wherein:
the respective operation associated with the first control is a non-destructive operation; and
the respective operation associated with the second control is a destructive operation.

3. The method of claim 2, wherein the respective operation associated with the second control is a delete operation.

4. The method of claim 1, wherein the second control is a delete button.

5. The method of claim 1, wherein the touch-sensitive surface is a touchpad.

6. The method of claim 1, wherein the touch-sensitive surface is a touch screen display.

7. The method of claim 1, wherein the pressure of the respective contact is inferred from one or more behaviors of the respective contact in a spatial domain.

8. The method of claim 1, wherein the pressure of the respective contact is determined based on a pressure signal that is directly available from one or more sensors of the device.

9. The method of claim 1, wherein:
the respective contact has a maximum pressure greater than the first control-activation pressure and less than the second control-activation pressure during the gesture; and
the method includes:
in accordance with a determination that the respective control is the first control, performing the respective operation associated with first control; and
in accordance with a determination that the respective control is the second control, foregoing performance of the respective operation associated with second control.

10. The method of claim 1, wherein:
the respective operation is performed in accordance with a determination that:
the respective contact has a pressure during the gesture that is above the respective pressure threshold; and
the respective contact has a duration above a respective duration threshold; and
performance of the respective operation is forgone in accordance with a determination that:
the respective contact does not have a pressure during the gesture that is above the respective pressure threshold; and/or
the respective contact does not have a duration that is above the respective duration threshold.

11. An electronic device, comprising:
a display;
a touch-sensitive surface;
a processor;
a memory; and
one or more programs, wherein the one or more programs are stored in the memory and configured to be executed by the processor, the one or more programs including instructions for:
concurrently displaying, on the display, a plurality of controls of a same control type, including a first control associated with a first control-activation pressure threshold and a second control associated with a second control-activation pressure threshold that is higher than the first control-activation pressure threshold;
detecting a multipoint input that includes concurrently detecting a plurality of contacts, that includes a respective contact, on the touch-sensitive surface;
while the respective contact is at a location on the touch-sensitive surface that corresponds to a respective control of the first control or the second control:
detecting a gesture corresponding to the respective contact; and
in response to detecting the gesture:
in accordance with a determination that the respective contact has a pressure during the gesture that is above the respective pressure threshold associated with the respective control, performing a respective operation associated with the respective control in accordance with the interaction; and
in accordance with a determination that the respective contact does not have a pressure during the gesture that is above the respective pressure threshold, foregoing performing the respective operation associated with the respective control.

12. The device of claim 11, wherein:
the respective operation associated with the first control is a non-destructive operation; and
the respective operation associated with the second control is a destructive operation.

13. The device of claim 12, wherein the respective operation associated with the second control is a delete operation.

14. The device of claim 11, wherein the second control is a delete button.

15. The device of claim 11, wherein the touch-sensitive surface is a touchpad.

16. The device of claim 11, wherein the touch-sensitive surface is a touch screen display.

17. The device of claim 11, wherein the pressure of the respective contact is inferred from one or more behaviors of the respective contact in a spatial domain.

18. The device of claim 11, wherein the pressure of the respective contact is determined based on a pressure signal that is directly available from one or more sensors of the device.

19. The device of claim 11, wherein:
the respective contact has a maximum pressure greater than the first control-activation pressure and less than the second control-activation pressure during the gesture; and
the one or more programs include instructions for:
in accordance with a determination that the respective control is the first control, performing the respective operation associated with first control; and
in accordance with a determination that the respective control is the second control, foregoing performance of the respective operation associated with second control.

20. The device of claim 11, wherein:
the respective operation is performed in accordance with a determination that:
the respective contact has a pressure during the gesture that is above the respective pressure threshold; and
the respective contact has a duration above a respective duration threshold; and
performance of the respective operation is forgone in accordance with a determination that:
the respective contact does not have a pressure during the gesture that is above the respective pressure threshold; and/or
the respective contact does not have a duration that is above the respective duration threshold.

21. A non-transitory computer readable storage medium storing one or more programs, the one or more programs comprising instructions, which when executed by an electronic device with a touch-sensitive surface and a display, cause the electronic device to:
concurrently display, on the display, a plurality of controls of a same control type, including a first control associated with a first control-activation pressure threshold and a second control associated with a second control-activation pressure threshold that is higher than the first control-activation pressure threshold;
detect a multipoint input that includes concurrently detecting a plurality of contacts, that includes a respective contact, on the touch-sensitive surface;
while the respective contact is at a location on the touch-sensitive surface that corresponds to a respective control of the first control or the second control:

detect a gesture corresponding to the respective contact; and in response to detecting the gesture:

in accordance with a determination that the respective contact has a pressure during the gesture that is above the respective pressure threshold associated with the respective control, perform a respective operation associated with the respective control in accordance with the interaction; and in accordance with a determination that the respective contact does not have a pressure during the gesture that is above the respective pressure threshold, forgo performing the respective operation associated with the respective control.

22. The non-transitory computer readable storage medium of claim 21, wherein:

the respective operation associated with the first control is a non-destructive operation; and the respective operation associated with the second control is a destructive operation.

23. The non-transitory computer readable storage medium of claim 22, wherein the respective operation associated with the second control is a delete operation.

24. The non-transitory computer readable storage medium of claim 21, wherein the second control is a delete button.

25. The non-transitory computer readable storage medium of claim 21, wherein the touch-sensitive surface is a touch-pad.

26. The non-transitory computer readable storage medium of claim 21, wherein the touch-sensitive surface is a touch screen display.

27. The non-transitory computer readable storage medium of claim 21, wherein the pressure of the respective contact is inferred from one or more behaviors of the respective contact in a spatial domain.

28. The non-transitory computer readable storage medium of claim 21, wherein the pressure of the respective contact is determined based on a pressure signal that is directly available from one or more sensors of the device.

29. The non-transitory computer readable storage medium of claim 21, wherein:

the respective contact has a maximum pressure greater than the first control-activation pressure and less than the second control-activation pressure during the gesture; and the one or more programs include instructions which cause the electronic device to:

in accordance with a determination that the respective control is the first control, perform the respective operation associated with first control; and in accordance with a determination that the respective control is the second control, forego performance of the respective operation associated with second control.

30. The non-transitory computer readable storage medium of claim 21, wherein:

the respective operation is performed in accordance with a determination that:

the respective contact has a pressure during the gesture that is above the respective pressure threshold; and the respective contact has a duration above a respective duration threshold; and performance of the respective operation is forgone in accordance with a determination that:

the respective contact does not have a pressure during the gesture that is above the respective pressure threshold; and/or the respective contact does not have a duration that is above the respective duration threshold.

* * * * *